(12) United States Patent
Tonnesen et al.

(10) Patent No.: US 10,990,567 B2
(45) Date of Patent: Apr. 27, 2021

(54) AUTOMATED DECISION ENGINE FOR SETTING I/O SERVICE LEVEL OBJECTIVES FOR I/O TAGGING

(71) Applicant: EMC IP Holding Company LLC, Hopkinton, MA (US)

(72) Inventors: Drew P. Tonnesen, Bedford, NH (US); Yaron Dar, Sudbury, MA (US); Felix Shvaiger, Nashua, NH (US); Arieh Don, Newton, MA (US)

(73) Assignee: EMC IP Holding Company LLC, Hopkinton, MA (US)

( * ) Notice: Subject to any disclaimer, the term of this patent is extended or adjusted under 35 U.S.C. 154(b) by 386 days.

(21) Appl. No.: 16/043,483

(22) Filed: Jul. 24, 2018

(65) Prior Publication Data

US 2020/0034460 A1 Jan. 30, 2020

(51) Int. Cl.
*G06F 16/21* (2019.01)
*G06F 16/22* (2019.01)

(52) U.S. Cl.
CPC ........ *G06F 16/211* (2019.01); *G06F 16/2282* (2019.01)

(58) Field of Classification Search
CPC ............... G06F 16/211; G06F 16/2282; G06F 2201/87; G06F 11/3409; G06F 11/3485; G06F 11/1474; G06F 16/217; G06F 3/067; G06F 3/0659
USPC .................................. 707/E17.01, 758, 803
See application file for complete search history.

(56) References Cited

U.S. PATENT DOCUMENTS

| | | | | |
|---|---|---|---|---|
| 8,429,307 | B1 * | 4/2013 | Faibish | G06F 3/0685 710/5 |
| 9,189,387 | B1 * | 11/2015 | Taylor | G06F 3/06 |
| 9,258,242 | B1 * | 2/2016 | Mallick | H04L 41/5019 |
| 9,781,057 | B1 * | 10/2017 | Foley | G06F 9/524 |
| 10,503,672 | B2 * | 12/2019 | O'Neill | G06F 11/3034 |
| 10,534,720 | B2 * | 1/2020 | Shih | G06F 12/123 |

(Continued)

OTHER PUBLICATIONS

Thomas F. O'Neill, et al., "Time Dependent Service Level Objectives," U.S. Appl. No. 15/963,398, filed Apr. 26, 2018.

(Continued)

*Primary Examiner* — Phong H Nguyen
(74) *Attorney, Agent, or Firm* — Muirhead and Saturnelli, LLC

(57) ABSTRACT

Techniques for processing I/O operations may include: receiving, an I/O operation including a tag value denoting a process of a database application that issued the I/O operation; determining, in accordance with the tag value, whether the I/O operation is directed to a data file storing content of a database or a log file of recorded operations of the database; and responsive to determining the I/O operation is directed to a data file storing content of the database, performing processing including: determining a current configuration setting of the database that indicates whether the database is configured for use with the database application as an in-memory database; and determining, in accordance with current configuration setting of the database, a first service level objective for the I/O operation, wherein the first service level objective for the I/O operation is a default service level objective or a revised service level objective.

19 Claims, 16 Drawing Sheets

(56) References Cited

U.S. PATENT DOCUMENTS

| | | | |
|---|---|---|---|
| 2007/0255865 A1* | 11/2007 | Gaither | G06F 9/5077 710/36 |
| 2010/0169570 A1* | 7/2010 | Mesnier | G06F 3/0644 711/114 |
| 2015/0074355 A1* | 3/2015 | Sampathkumar | G06F 12/0804 711/135 |

OTHER PUBLICATIONS

Stephen Smaldone, et al., "Meeting Backup Window Requirements While Managing Storage Array Backup Load," U.S. Appl. No. 15/876,143, filed Jan. 20, 2018.

* cited by examiner

| Application 402 | Process Name 404 | Host 406 | Tag 408 | SLO time-frame pair(s) 410 |
|---|---|---|---|---|
| DB Application 410 | LOGWRITER_SALES | host1 | 1 | SLO diamond 8am-8pm M-W |
| | LOGWRITER_MKTG | host1 | 2 | SLO diamond 8am-8pm Th and Fri |
| | DBWRITER_SALES | host1 | 3 | SLO diamond June 1-7 |
| | DBWRITER_MKTG | host1 | 4 | SLO diamond Jan 30-31 |
| Email application 420 | EPROCA_1 | host2 | 5 | SLO diamond always |
| | EPROCB_1 | host2 | 6 | SLO bronze 8am-8pm |
| Backup application 430 | BUAGENT_1 | host1 | 7 | SLO bronze 8am-8pm |
| | | | | SLO diamond 8pm – 8 am |

PNT 330

410a, 410b, 410c, 410d, 420a, 420b, 430a

Default SLOs 333:
Default SLO SG1, DB application and Backup application = Gold
Default SLO SG2 and Email application = Gold

FIG. 7

AUTOMATED DECISION ENGINE FOR SETTING I/O SERVICE LEVEL OBJECTIVES FOR I/O TAGGING

BACKGROUND

Technical Field

This application generally relates to data storage and, in particular, application performance and service level objectives (SLOs) in connection with I/O processing.

Description of Related Art

Data storage systems may include resources used by one or more host systems. Data storage systems and host systems may be interconnected by one or more communication connections such as in a network. These resources may include, for example, data storage devices such as those included in the data storage systems manufactured by Dell EMC™. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, a host may perform I/O operations such as data read and write operations sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

In accordance with one aspect of techniques herein is a method of processing I/O operations comprising: receiving, at a data storage system, an I/O operation including a tag value denoting a process of a database application that issued the I/O operation; determining, in accordance with the tag value of the I/O operation, whether the I/O operation is directed to a data file storing content of a database or a log file of recorded operations of the database; and responsive to determining the I/O operation is directed to a data file storing content of the database, performing first processing including: determining a current configuration setting of the database indicating whether the database is configured for use with the database application as an in-memory database; and determining, in accordance with current configuration setting of the database, a first service level objective for the I/O operation, wherein the first service level objective for the I/O operation is a default service level objective or a revised service level objective. The database may be configured as an in-memory database and the database may be stored in memory of a host that includes the database application and the process that issued the I/O operation. The first processing may include: determining whether the revised service level objective denotes a higher level of performance than the default service level objective; and responsive to determining the revised service level objective denotes a higher level of performance than the default service level objective, setting the first service level objective for the I/O operation to the default service level objective and otherwise setting the first service level objective for the I/O operation to the revised service level objective. The method may include asynchronously flushing updates of the in-memory database from the host to the data storage system, wherein the updates are applied to a copy of the database stored on non-volatile storage of the data storage system. The database may be configured as an on-disk database stored on the data storage system. The first processing may include: determining whether the revised service level objective denotes a higher level of performance than the default service level objective; and responsive to determining the revised service level objective denotes a higher level of performance than the default service level objective, setting the first service level objective for the I/O operation to the revised service level objective and otherwise setting the first service level objective for the I/O operation to the default service level objective. The method may include: monitoring I/Os received on the data storage system and extracting first information regarding the received I/Os, the first information including whether each of the received I/Os is a read or write, an I/O size of each of the received I/Os, and a tag value of each of the received I/Os; and updating I/O statistics in accordance with the first information, wherein the I/O statistics denote, for each of a plurality of defined tag values, an I/O pattern observed in connection with received I/O operations having said each defined tag value. The database application may include the process and a second process each associated with a different one of the plurality of defined tag values, and wherein a first portion of the I/O statistics may denote a first I/O pattern for the process of the database application and a second portion of the I/O statistics may denote a second I/O pattern for the second process of the database application. The method may include: matching first I/O statistics for the database application with one of a plurality of I/O profiles, wherein the first I/O statistics for the database application include the first portion and the second portion of the I/O statistics; determining, in accordance with the one I/O profile matching the first I/O statistics, an expected database configuration setting denoting whether a database storing content associated with the one I/O profile is configured as in-memory or on-disk; and setting the current configuration setting of the database to the expected database configuration setting associated with the one I/O profile matching the first I/O statistics for the database application.

In accordance with another aspect of techniques herein is a system comprising: a processor; and a memory comprising code stored thereon that, when executed, performs a method of processing I/O operations comprising: receiving, at a data storage system, an I/O operation including a tag value denoting a process of a database application that issued the I/O operation; determining, in accordance with the tag value of the I/O operation, whether the I/O operation is directed to a data file storing content of a database or a log file of recorded operations of the database; and responsive to determining the I/O operation is directed to a data file storing content of the database, performing first processing including: determining a current configuration setting of the database indicating whether the database is configured for use with the database application as an in-memory database; and determining, in accordance with current configuration setting of the database, a first service level objective for the I/O operation, wherein the first service level objective for the I/O operation is a default service level objective or a revised service level objective.

In accordance with another aspect of techniques herein is a computer readable medium comprising code stored thereon that, when executed, performs a method of processing I/O operations comprising: receiving, at a data storage system, an I/O operation including a tag value denoting a process of a database application that issued the I/O operation; determining, in accordance with the tag value of the I/O operation, whether the I/O operation is directed to a data file storing content of a database or a log file of recorded operations of the database; and responsive to determining the I/O operation is directed to a data file storing content of the database, performing first processing including: determining a current configuration setting of the database indicating whether the database is configured for use with the database application as an in-memory database; and determining, in accordance with current configuration setting of the database, a first service level objective for the I/O operation, wherein the first service level objective for the I/O operation is a default service level objective or a revised service level objective. The database may be configured as an in-memory database and the database may be stored in memory of a host that includes the database application and the process that issued the I/O operation. The first processing may include: determining whether the revised service level objective denotes a higher level of performance than the default service level objective; and responsive to determining the revised service level objective denotes a higher level of performance than the default service level objective, setting the first service level objective for the I/O operation to the default service level objective and otherwise setting the first service level objective for the I/O operation to the revised service level objective. The method may include asynchronously flushing updates of the in-memory database from the host to the data storage system, wherein the updates are applied to a copy of the database stored on non-volatile storage of the data storage system. The database may be configured as an on-disk database stored on the data storage system. The first processing may include: determining whether the revised service level objective denotes a higher level of performance than the default service level objective; and responsive to determining the revised service level objective denotes a higher level of performance than the default service level objective, setting the first service level objective for the I/O operation to the revised service level objective and otherwise setting the first service level objective for the I/O operation to the default service level objective. The method may include: monitoring I/Os received on the data storage system and extracting first information regarding the received I/Os, the first information including whether each of the received I/Os is a read or write, an I/O size of each of the received I/Os, and a tag value of each of the received I/Os; and updating I/O statistics in accordance with the first information, wherein the I/O statistics denote, for each of a plurality of defined tag values, an I/O pattern observed in connection with received I/O operations having said each defined tag value. The database application may include the process and a second process each associated with a different one of the plurality of defined tag values, and wherein a first portion of the I/O statistics may denote a first I/O pattern for the process of the database application and a second portion of the I/O statistics may denote a second I/O pattern for the second process of the database application. The method may include: matching first I/O statistics for the database application with one of a plurality of I/O profiles, wherein the first I/O statistics for the database application include the first portion and the second portion of the I/O statistics; determining, in accordance with the one I/O profile matching the first I/O statistics, an expected database configuration setting denoting whether a database storing content associated with the one I/O profile is configured as in-memory or on-disk; and setting the current configuration setting of the database to the expected database configuration setting associated with the one I/O profile matching the first I/O statistics for the database application.

BRIEF DESCRIPTION OF THE DRAWINGS

Features and advantages of the present invention will become more apparent from the following detailed description of exemplary embodiments thereof taken in conjunction with the accompanying drawings in which:

FIGS. 3, 5, 6 and 7 are examples of systems and components that may be used in connection with techniques herein;

DETAILED DESCRIPTION OF EMBODIMENT(S)

Figure 1:
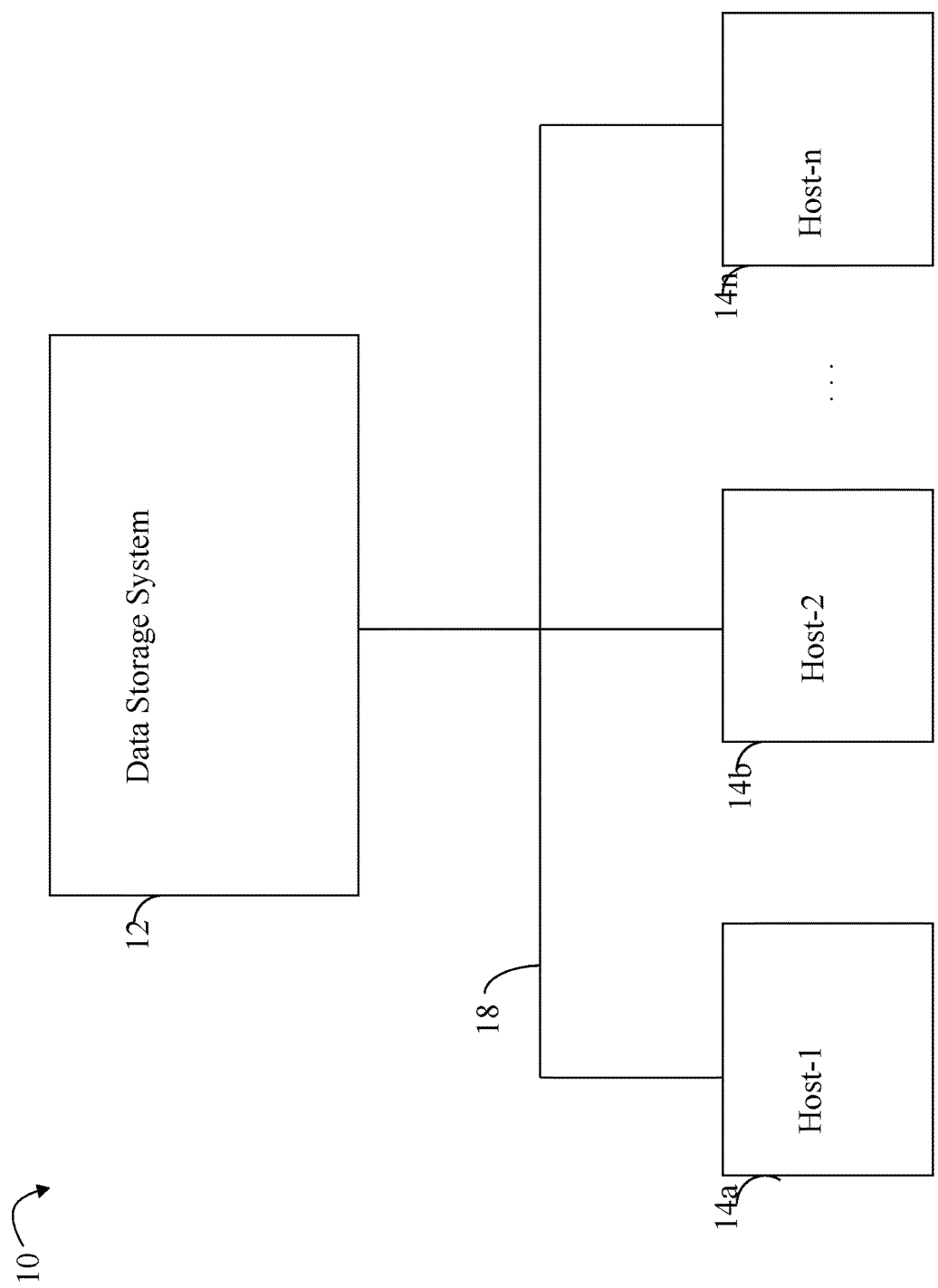
FIG. 1 is an example of an embodiment of a computer system that may utilize the techniques described herein.

Referring to FIG. 1, shown is an example of an embodiment of a system that may be used in performing the techniques described herein. The system 10 includes a data storage system 12, such as a data storage array, connected to host systems 14a-14n through communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connections known in the art. For example, the communication medium 18 may be an intranet, network or other wireless or other hardwired connection(s) by which the host systems 14a-14n may access and communicate with the data storage system 12, and may also communicate with others included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and data storage system may all be located at the same physical site, or, alternatively, may also be located in different physical locations. Examples of the communication medium that may be used to provide the different types of connections between the host computer systems and the data storage system of the system 10 may use a variety of different communication protocols such as TCP/IP, SCSI (Small Computer Systems Interface), Fibre Channel, iSCSI, Fibre Channel over Ethernet, and the like. Some or all of the connections by which the hosts and data storage system 12 may be connected to the communication medium 18 may pass through other communication devices, switching equipment that may exist such as a phone line, a repeater, a multiplexer or even a satellite.

Each of the host computer systems may perform different types of data operations in accordance with different types of administrative tasks. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, such as a single data storage array as Dell EMC™'s Symmetrix® VMAX® data storage system, as well one or more other data storage systems as may vary with the embodiment.

Figure 2A:
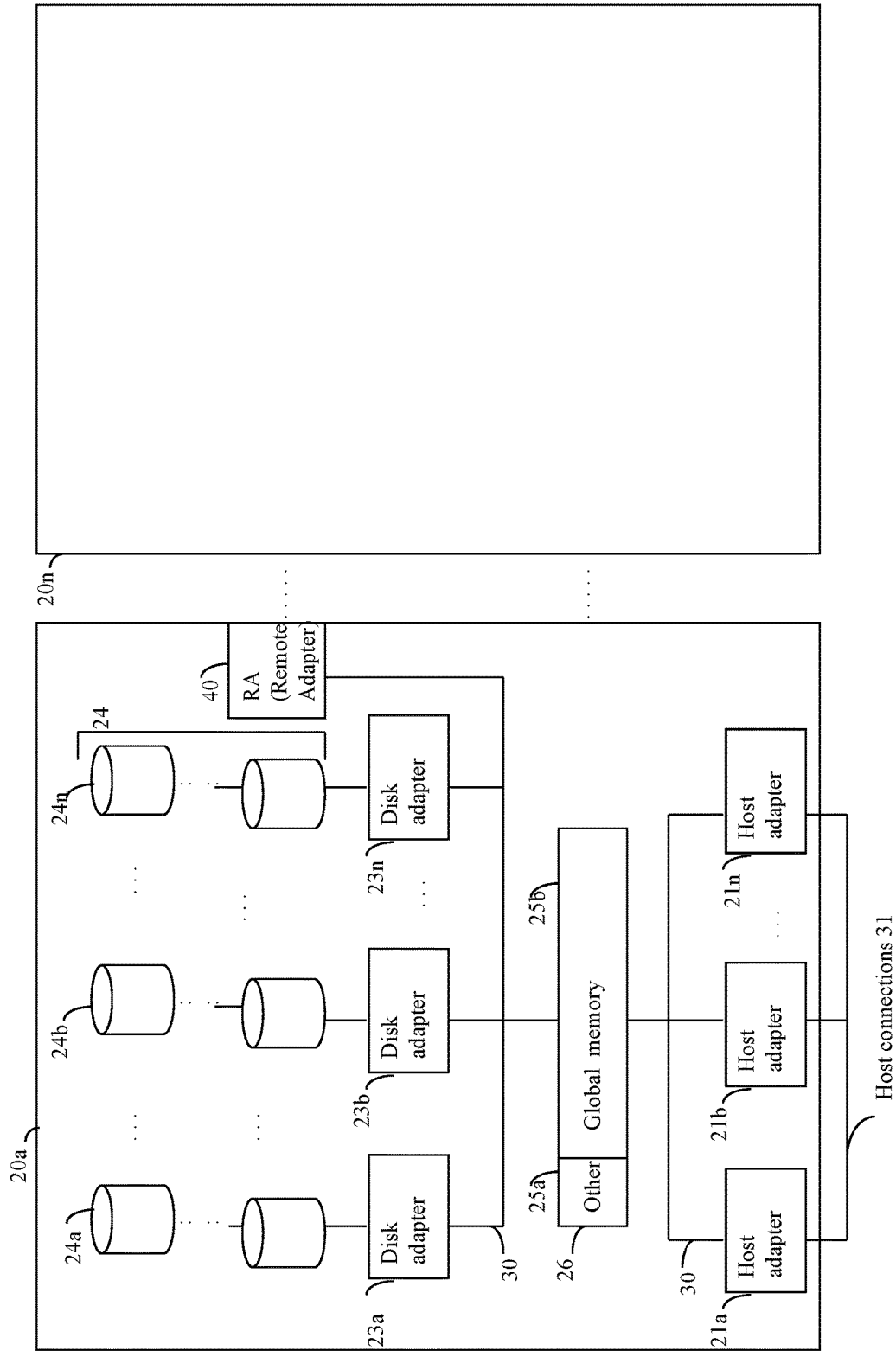
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of 20a-20n may be resources included in an embodiment of the system 10 of FIG. 1 to provide storage services to, for example, host computer systems. It should be noted that the data storage system 12 may operate stand-alone, or may also be included as part of a storage area network (SAN) that includes, for example, other components.

Each of the data storage systems, such as 20a, may include a plurality of disk devices or volumes, such as the arrangement 24 consisting of n groupings of disks or more generally, data storage devices, 24a-24n which are physical storage devices providing backend physical storage. In this arrangement, each of the n groupings of disks or physical storage devices may be connected to a disk adapter ("DA") or director responsible for the backend management of operations to and from a portion of the disks 24. In the system 20a, a single DA, such as 23a, may be responsible for the management of a grouping of disks, such as grouping 24a. In a data storage system such as by Dell EMC™, a backend DA may also be referred to as a disk or physical device controller. The DA may perform operations such as reading data from, and writing data to, the physical devices (e.g., physical storage devices also referred to as PDs) which are serviced by the DA. Consistent with description elsewhere herein, the physical storage devices providing the back-end physical storage may include any suitable non-volatile storage such as, for example, rotating disk drives, flash-based drives or more generally solid state drives, and the like.

Also shown in the storage system 20a is an RA or remote adapter 40. The RA may be hardware including a processor used to facilitate communication between data storage systems, such as between two of the same or different types of data storage systems.

The system 20a may also include one or more host adapters ("HAs") or directors 21a-21n. Each of these HAs may be used to manage communications and data operations between one or more host systems and the global memory. In an embodiment, the HA may be a Fibre Channel Adapter (FA) or other adapter which facilitates host communication. Generally, directors may also be characterized as the different adapters, such as HAs (including FAs), DAs RAs and the like, as described herein. Components of the data storage system, such as an HA, which may communicate with a host and receive host data requests such as I/O operations may also be referred to as front end components. A component of the data storage system which communicates with a front end component may be characterized as a backend component, such as a DA. In connection with data storage systems, various types of directors or adapters may be implemented as a processor, or, more generally, a component that includes the processor.

Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other disk adapters or directors, and other components of the system 20a. The other portion 25a is that portion of memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

Host systems provide data and more generally issue commands through channels to the storage systems, and the storage systems may also provide data to the host systems also through the channels. The host systems do not address the disk drives of the storage systems directly, but rather access to data may be provided to one or more host systems from what the host systems view as a plurality of logical devices or logical units. A logical unit (LUN) may be characterized as a disk array or data storage system reference to an amount of storage space that has been formatted and allocated for use to one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical storage devices or drives. For example, one or more LUNs may reside on a single physical storage device or drive. A LUN may also be referred to herein as a storage device or a logical storage device having is physical storage generally provisioned from one or more physical storage devices. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s), or more generally physical storage devices, and LUN(s) residing thereon.

A storage service may be used to service requests directed to storage devices, such as LUNs that are consumed by an application running on a host processor. Examples of storage services may include block-based data storage services (e.g., processes requests to read and write data to a LUN exposed by the data storage system as a block-based device), file-based data storage services (e.g., processes requests to read and write data to a file of a file systems having its storage provisioned from LUNs and thus physical storage of the data storage system) and object-based data storage services. It should be noted that an embodiment in accordance with techniques herein may provide such storage services using code that executes on the data storage system or another component other than the data storage system (e.g., components external to the data storage system). In at least one embodiment, at least some of the storage services may be reside in the data storage system. For example, a block-based storage service may include code that is executed by an HA or otherwise is provided in a service (e.g., code executed by another processor within the data storage system) that interfaces with the HA.

The DA performs I/O operations on a disk drive or other physical storage device. Data residing on a disk drive or other physical storage device may be accessed by the DA following a data request in connection with I/O operations that other directors originate. The DA may also be further characterized in at least one embodiment as a controller providing access to external physical drives or storage devices located on one or more external data storage systems rather than local physical drives located in the same physical storage system as the DA (such as illustrated in FIG. 2A).

Figure 2B:
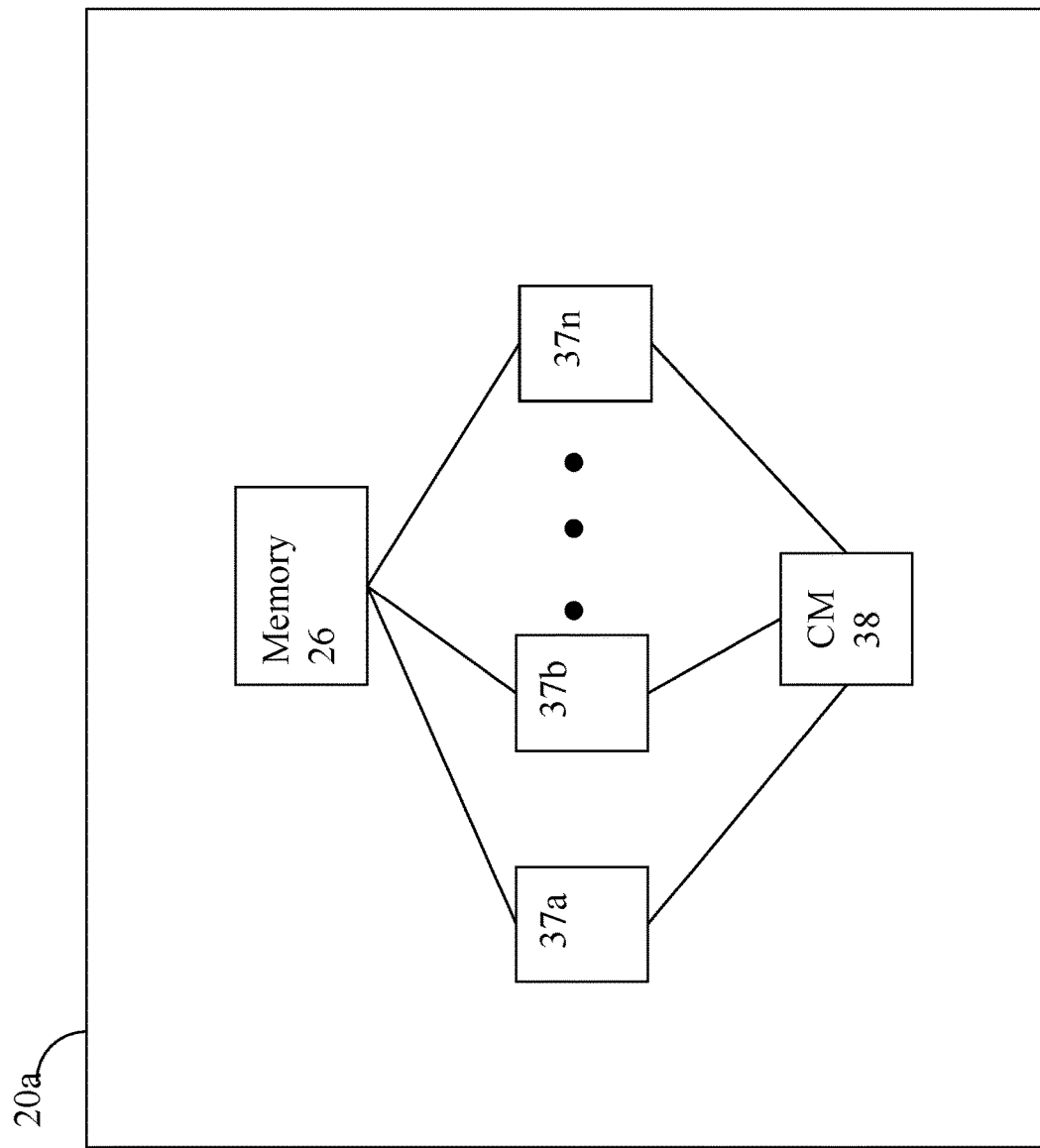
FIG. 2B is a representation of the logical internal communications between the directors and memory included in one embodiment of data storage system of FIG. 2A.

Referring to FIG. 2B, shown is a representation of the logical internal communications between the directors and memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. In an embodiment disclosed herein, there may be up to sixteen directors coupled to the memory 26. Other embodiments may use a higher or lower maximum number of directors that may vary. For example, an embodiment in accordance with techniques herein may support up to 128 directors per data storage system, such as a data storage array. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system as described in more detail below. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with techniques herein. Those skilled in the art will appreciate that techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with techniques herein, components such as HAs, DAs, and the like may be implemented using one or more "cores" or processors each having their own memory used for communication between the different front end and back end components rather than utilize a global memory accessible to all storage processors.

It should be noted that although examples of techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

Figure 3:
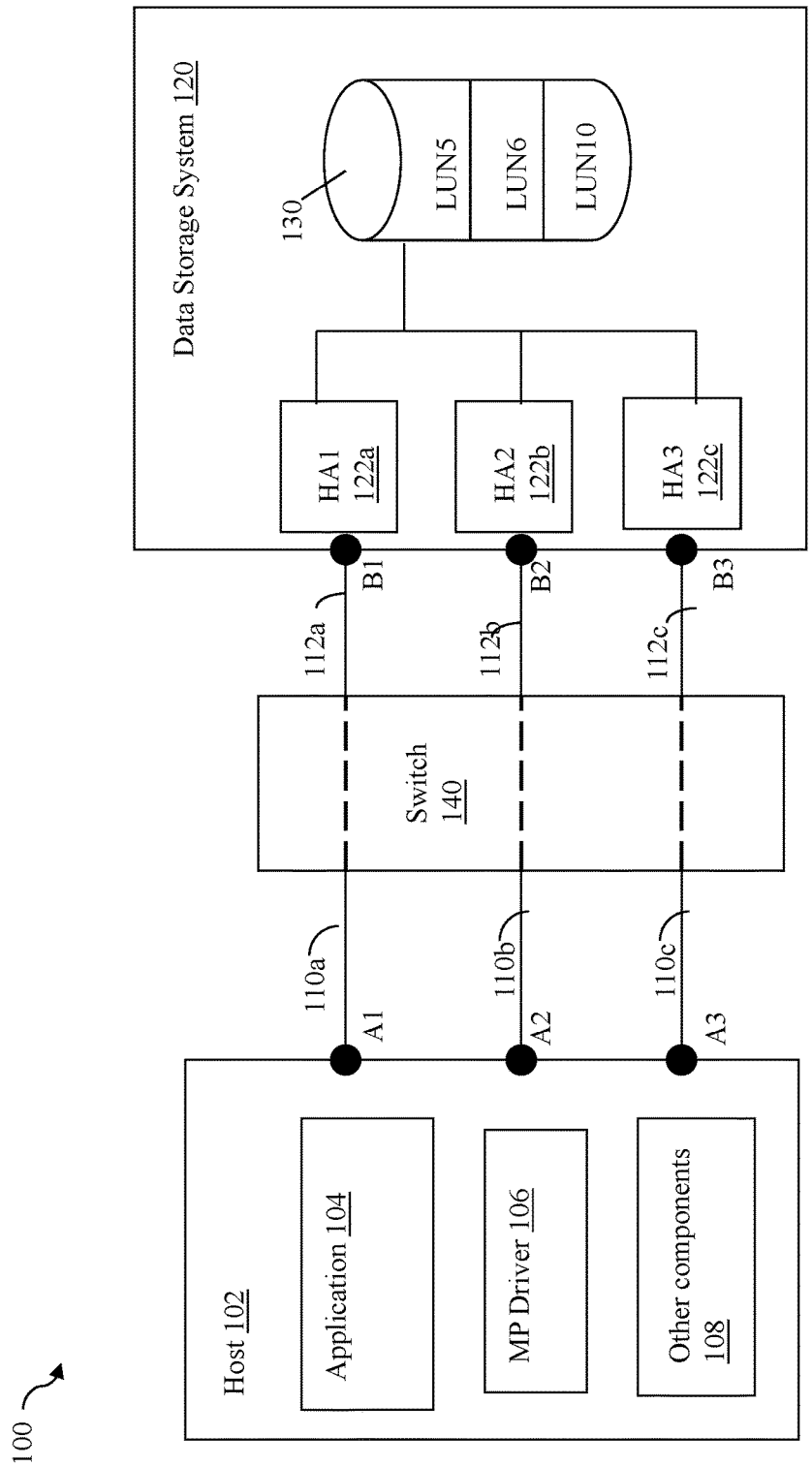

Referring to FIG. 3, shown is an example of an embodiment of a system that may be utilized in connection with techniques herein. The example 100 includes a host 102, switch 140 and data storage system 120. The host 102 and data storage system 120 may communicate over one or more paths through the switch 140. Elements 110a-110c denote connections between the host 102 and switch 140. Element 112a-112c denote connections between the data storage system 120 and the switch 140. Element 130 may represent a physical storage device of the data storage system 120, such as a rotating disk drive, flash-based or other solid state storage device, and the like, where the physical storage device 130 may be configured to include 3 LUNs—LUN5, LUN6 and LUN10. It should be noted that the example 100 includes only a single host, single physical device 130 with 3 LUNs, a single data storage system, and a fabric including a single switch for purposes of simplicity to illustrate the techniques herein. For example, each of the LUNs may be configured to have storage provisioned from multiple different physical devices rather than a single physical device, and multiple hosts having multiple applications executing thereon may communicate with the data storage system.

It should be noted that following paragraphs and examples may refer to a particular examples using switch 140 having a switching fabric for simplicity of illustration, element 140 may be a single switch having a switching fabric, a multi-switch having a multi-switch fabric and the like. Thus, element 140 may more generally denote a network having its own connectivity fabric or network fabric where the network may include one or more components providing the connectivity between the host 102 and data storage system 120.

The host 102 may include an application 104, a multi-path (MP) driver 106 and other components 108 whereby element 108 may also include one or more other device drivers and other code. An I/O operation from the application 104 may be communicated to the data storage system 120 using the MP driver 106 and one or more other components represented by element 108. The application 104 may be a database or other application which issues data operations, such as I/O operations, to the data storage system 120. Each of the I/O operations may be directed to a target device, such as one of the LUNs of device 130, configured to be accessible to the host 102 over multiple physical paths. As such, each of the I/O operations may be forwarded from the application 104 to the data storage system 120 over one of the possible multiple paths. The MP driver 106 may include functionality to perform any one or more different types of processing such as related to encryption, multipathing, mirroring, migration, and the like. For example, the MP driver 106 may include multipathing functionality for management and use of multiple paths. For example, the MP driver 106 may perform path selection to select one of the possible multiple paths based on one or more criteria such as load balancing to distribute I/O requests for the target device across available active paths. Load balancing may be performed to provide for better resource utilization and increased performance of the host, data storage system, and network or other connection infrastructure. The MP driver 106 may be included a commercially available product such as, for example, Dell EMC™ PowerPath® software. The host 102 may also include other components 108 such as one or more other layers of software used in connection with communicating the I/O operation from the host to the data storage system 120. For example, element 108 may include Fibre Channel or SCSI drivers, a logical volume manager (LVM), and the like. It should be noted that element 108 may include software or other components used when sending an I/O operation from the application 104 where such components include those invoked in the call stack above the MP driver 106 and also below the MP driver 106. For example, application 104 may issue an I/O operation which is communicated in a call stack including an LVM, the MP driver 106, and an FC or SCSI driver. This is described in more detail below such as with a subsequent figure.

The data storage system 120 may include one or more physical data storage devices, such as device 130, where each such physical device may be configured to store data of one or more LUNs as described above. Each of the LUNs having data stored on the device 130 may be configured to be accessible to the host through one or more paths. For example, all LUNs of 130 may be accessible using ports of the three front end directors or interfaces 122a-122c, also denoted respectively HA1, HA2 and HA3. The multiple paths allow the application I/Os to be routed over multiple paths and, more generally, allow the LUNs of device 130 to be accessed over multiple paths. In the event that there is a component failure in one of the multiple paths, application I/Os can be easily routed over other alternate paths unaffected by the component failure. Thus, an embodiment of the MP driver 106 may also perform other processing, such as described in more detail in following paragraphs, in addition to load balancing in connection with path selection. The MP driver 106 may be aware of, and may monitor, all paths between the host and the LUNs of the device 130 in order to determine which of the multiple paths are active or available at a point in time, which of the multiple paths are unavailable for communications, and to use such information to select a path for host-data storage system communications.

In the example 100, each of the LUNs of the device 130 may be configured as accessible through three paths. Each path may be represented by two path endpoints—a first endpoint on the host 102 and a second endpoint on the data storage system 120. The first endpoint may correspond to a port of a host component, such as a host bus adapter (HBA) of the host 102, and the second endpoint may correspond to a port of a data storage system component, such as a port of an HA of the data storage system 120. In the example 100, elements A1, A2 and A3 each denote a port of a host 102 (e.g. such as a port of an HBA), and elements B1, B2 and B3 each denote a port of an HA of the data storage system 120. Each of the LUNs of the device 130 may be accessible over three paths—a first path represented by A1-B1, a second path represented by A2-B2 and a third path represented by A3-B3.

Figure 4:
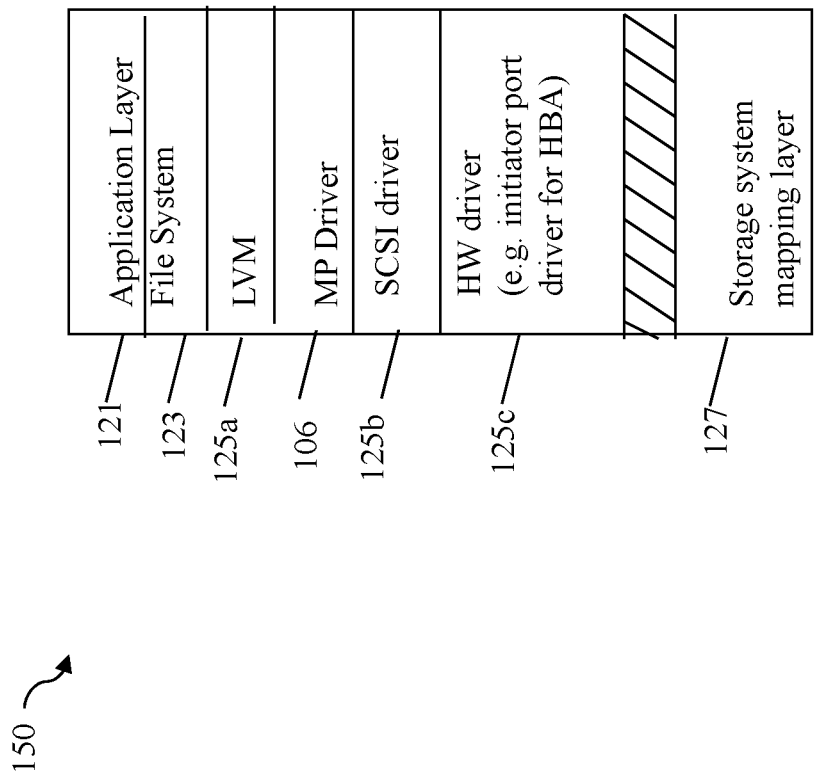
FIG. 4 is an example of different software layers that may be included in a host and data storage system in an embodiment in accordance with techniques herein.

Referring to FIG. 4, shown is a representation of a number of mapping layers that may be included in a computer system, such as host 102 of FIG. 3, in combination with a data storage system. FIG. 4 provides further detail regarding various software layers that may be used in connection with the MP driver 106 of FIG. 3. The various software layers of 150 may generally form layers included in the runtime I/O stack, such as when an I/O request is issued by an application on a host to a data storage system. The system includes an application layer 121 which includes application programs executing on the host computer 102. The application layer 121 may refer to storage locations using an associated label or identifier such as a file name or file identifier. Below the application layer 121 is the file system layer 123 and the LVM layer 125a that maps the label or identifier specified by the application layer 121 to a LUN which the host may perceive as corresponding to a physical device address (e.g., the address of one of the disk drives) within the storage system 12. Below the LVM layer 125a may be the MP (multipath) driver 106 which handles processing of the I/O received from layer 125a. The MP driver 106 may include a base driver and one or more driver extension modules. The MP driver 106 may be included in a commercially available product such as Dell EMC™ PowerPath® software. Functionality for performing multipathing operations such as may be performed by Dell EMC™ PowerPath® software may be included in one of the driver extension modules such as a multipath extension module. As described above, the MP driver may perform processing in connection with multiple path management and selecting one of a plurality of possible paths for use in connection with processing I/O operations and communicating with the data storage system, such as 120 of FIG. 3. More generally, one or more layers between the application layer 121 and the MP driver 106 may provide for mapping a LUN (such as used in connection with block-based storage) presented by the data storage system to the host to another logical data storage entity, such as a file, that may be used by the application layer 123. Below the MP driver 106 may be the SCSI driver 125b and a hardware (HW) driver 125c. The SCSI driver 125b may handle processing of a received I/O request from the MP driver 106 such as related to forming a request in accordance with the SCSI standard. The driver 125c may be a HW driver that facilitates communication with hardware on the host. The driver 125c may be, for example, a driver for an HBA of the host which sends commands or requests to the data storage system and also receives responses and other communications from the data storage system.

It should be noted that an embodiment may also include mapping layers as in FIG. 4 with a variation that the ordering of the MP driver 106 and SCSI driver 125b may be reversed.

In some embodiments, the data storage system 120 of FIG. 3 may be an intelligent data storage system having its own mapping layer 127 such that the LUN known or exposed to the host may not directly correspond to a physical device such as a disk drive. In such embodiments, the LUN specified by the host in the command associated with the I/O operation may be further mapped by the data storage system using its mapping layer 127. For example, a LUN specified by the host may be mapped by the data storage system to one or more physical drives, multiple LUNs may be located on a same physical device, multiple physical drives, and the like. In other embodiments, the data storage system may not include such a mapping layer 127.

The MP driver 106, as well as other components illustrated in FIG. 4, may execute in kernel mode or other privileged execution mode. In one embodiment using a Unix-based operating system, the MP driver 106 may executed in kernel mode. In contrast, an application such as represented by application layer 121 may typically execute in user mode, or more generally, a non-privileged execution mode. Furthermore, it will be appreciated by those skilled in the art that the techniques herein may be used in an embodiment having any one of a variety of different suitable operating systems including a Unix-based operating system as mentioned above, any one of the Microsoft Windows® operating systems, and the like. Additionally, the host may provide a virtualized environment and may execute, for example, VMware ESX or VMware ESXi software providing bare metal embedded hypervisors.

In operation, an application executing at application layer 121 may issue one or more I/O operations (e.g., read and write operations) to logical volumes (implemented by the LVM 125a) or files (implemented using the file system 123) whereby such I/O operation may be then mapped to data operations directed to LUNs of the data storage system. Such I/O operations from the application layer 121 may be directed to the MP driver 106 after passing through any intervening layers such as layers 123 and 125a.

In connection with an embodiment in accordance with techniques herein, communications between an initiator port of the host and a target port of a data storage system (e.g., target port of an HA) may include those related to I/O operations and other non-I/O commands such as related to host control operations. I/O operations may include, for example, read and write operations with respect to data stored on a LUN.

In connection with the SCSI standard, a path may be defined between two ports as described above. A command may be sent from the host (as well as a component thereof such as a host bus adapter) and may be characterized as an initiator, originator or source with respect to the foregoing path. The host, as the initiator, sends requests to a data storage system (as well as a particular component thereof such as another HA having a port with a network address) characterized as a target, destination, receiver, or responder. Each physical connection of a path may be between a first endpoint which is a port of the host (e.g., such as of a host bus adapter having ports such as denoted as A1-A3 of FIG. 3) and a second endpoint which is a port of an HA (e.g., such as B1-B3 of FIG. 3) in the data storage system. Over each such path, one or more LUNs may be visible or exposed to the host initiator through the target port of the data storage system.

The data storage system may provide a multi-tenant (MT) environment whereby multiple tenants store their data on the data storage system. In such an exemplary MT environment, a different service level objective or SLO may be specified for each tenant that defines a guaranteed performance level for the tenant. For example, an SLO may be related to a guaranteed level of performance with respect to I/O operations serviced at the data storage system. In this case, the SLO specified may be expressed in terms of one or more metrics, such as based on response time (RT). For example, the SLO specified for the tenant may include an average response time (RT) with respect to I/Os issued by the tenant. To further illustrate, an SLO may specify an average RT of 3 milliseconds (ms.) for the tenant whereby the tenant is guaranteed to have an average RT of 3 ms. for each LUN storing the tenant's data. The tenant may also be referred to as a consumer of the data storage system having its data stored on the data storage system. A single tenant or consumer may be, for example, an application executing on a host. A single host may have one or more applications. In at least one embodiment, an SLO may be specified for each logical group of one or more LUNs, such as a storage group (SG) of LUNs used by one or more applications.

Additionally, although examples and illustrations herein may refer to a RT specified as an SLO, it should be noted that an SLO may be specified using one or more other metrics other than RT. For example, I/O related SLOs may be specified in terms of guaranteed I/O throughput (e.g., I/O rate such as I/Os per second), data throughput (e.g., megabytes per second), and the like. An SLO, such as the RT SLO described herein, may be applied on a per LUN level (e.g., guaranteed for each LUN individually).

If an SLO is not being met whereby the average measured or observed RT exceeds the SLO specified RT, such an occurrence may also be referred to herein as an SLO violation. As just noted, an embodiment may define an SLO violation as described above where the measured performance is worse than as specified by the SLO metric. It should be noted that an embodiment may also more generally define an SLO violation as obtaining a first value for a performance metric, such as average RT, based on observed or measured performance values where the first value deviates more than a threshold amount from a specified SLO value for the performance metric. For example, the SLO may specify an average RT of 3 ms. An SLO violation may be determined if the average RT (as determined from observed RT values) deviates more than 0.5 ms. from the 3 ms. Thus, an SLO violation may be determined if the average RT based on such measured performance is outside of the RT range 3 ms.+/−0.5 ms. or outside the inclusive range of 2.5 ms. through 3.5 ms. An embodiment may specify the deviation threshold amount, such as 0.5 ms, as a percentage of the specified SLO metric value 3 ms., or as a numeric quantity (e.g., real number). Thus, as described in more detail elsewhere herein, an SLO violation may also occur in some embodiments if the measured or observed performance is better than as specified in the SLO. Responsive to an SLO violation, remediation processing may be performed to attempt to alleviate, and, if possible, eliminate, the SLO violation. Any suitable technique may be used to remove the SLO violation. For example, remediation processing may be performed to increase I/O performance of an application when the measured RT is greater than the specified SLO RT. For example, if the SG of LUNs has a measured average RT of 5 ms and an SLO of 3 ms, processing may be performed to increase performance of I/Os directed to such LUNs of the SG such as by allocating additional resources for use by the I/Os directed to the SG LUNs, storing or moving the data of the SG LUNs on higher performance physical storage (e.g., migrating or movement of the LUN data to flash-based storage devices), increasing processing priority of pending I/Os directed to such SG LUNs (e.g., giving such pending I/Os directed to the SG LUNs higher priority relative to priority of other pending I/Os directed to other SGs), and the like.

In current SLO implementations not in accordance with techniques herein, an SLO may be assigned to each defined logical group of one or more LUNs, as noted above. In such a system not using techniques herein (whereby the single SLO is specified for the defined logical group of LUNs), each/every I/O directed to any LUN of the logical group have the same SLO (as specified for the SG) regardless of the application that issued the I/Os and also regardless of time of day, day of the week, etc. In some cases, multiple applications on the same host may use the same SG of LUNs. However, it may be that each of the applications has different SLO requirements depending on the time of day, day of month, day of week, calendar date, and the like. For example, a database application and a backup agent may both reside on the same host accessing the same SG of LUNs. The DB application may use a single SLO that does not vary with time; and the backup agent may require different SLOs where the particular one of the SLOs in effect or enforced for the backup agent may vary with time of day (e.g., the backup agent has a lower SLO and thus higher performance requirement in effect during evening/non-workday hours than during workday hours), day of the week (e.g., the backup agent has a lower SLO and thus higher performance requirement in effect during the weekend days Saturday and Sunday, as compared to work week days Monday-Friday), calendar date (e.g., the backup agent has a lower SLO and thus higher performance requirement in effect during end of month and end or year processing), and the like.

In following paragraphs, described are techniques for specifying an SLO at a finer level of granularity than per application or at a finer level of granularity than per SG for use with I/Os from all applications. In at least one embodiment, different SLOs may be specified for use in connection with I/Os issued by different processes thereby providing a per-process level of SLO control (e.g., where a single application may have multiple processes issuing I/Os). Additionally, techniques herein provide for specifying different SLOs for particular process instances (e.g., per process instances). Still further, an embodiment in accordance with techniques herein may provide for specifying time dependent SLOs whereby such SLOs may vary with one or more time-dependent factors, such as time of day, day of the week, calendar date (e.g., particular dates of a particular month), and the like. The time dependent SLOs may vary at the application level, per application, as well as at the finer level of per-process granularity (where there are multiple processes executing in the context of a single application, different SLOs may be specified for each of the multiple processes of the same single application), and at an even finer level of per process instance granularity (e.g., where there are multiple instances of the same application process executing such as due to multiple instances of the same application issuing I/Os). In at least one embodiment, the MP driver on the host may receive each I/O for processing prior to sending the I/O to the data storage system for servicing. The processing performed by the MP driver may include storing a tag or indicator in each I/O sent to the data storage system. The tag may identify the particular process, as well as the particular process instance, which originated the I/O being processed by the MP driver. When the I/O is received on the data storage system from the host, the data storage system may use the tag to determine the appropriate SLO for the particular process denoted by the tag. Additionally, depending on one or more other factors such as time of day, day of the week (e.g., Monday or Saturday), date, and the like, the data storage system may select the appropriate SLO for a particular process instance having multiple specified time-dependent SLOs effective or enforced at different times, days, dates, and the like.

In at least one embodiment described herein for purposes of illustration, SLOs may be specified using the following service levels, from highest service or performance level to lowest service or performance level: DIAMOND (highest), GOLD, SILVER, BRONZE (lowest). Each of the foregoing service levels may have an associated SLO such as a specified RT goal. For example, DIAMOND may have a 1 millisecond RT goal, GOLD may have a 3 millisecond RT goal, SILVER may have a 5 millisecond RT goal and BRONZE may have a 10 millisecond RT goal. Also as noted, each of the foregoing service levels may have an associated target range with a minimum and maximum RT. It should be noted that other embodiments may have additional and/or different service levels than as noted above and used elsewhere herein for purposes of illustration.

Referring back to FIG. 3, an application such as application 104 of the host 102, may include multiple processes each having a different process name. For example, the application 104 may be a database (DB) application which includes a first DBWRITER process that writes to the database (DB) stored on the data storage system and a second LOGWRITER process that writes to a log to log the database modification operations. The MP driver 106 on the host 102 receives the I/Os originating from both the first and second processes of the DB application whereby the MP driver knows which process originates each I/O it receives and then sends to the data storage system for processing.

In at least one embodiment in accordance with techniques herein, each process name for an application process (e.g., such as each of the above-noted first and second processes) includes multiple portions comprising a first portion and a second portion. In at least one embodiment, the first portion may denote the particular application process, such the above-noted LOGWRITER process that writes to the log file for the database instance, or the above-noted DBWRITER process that writes to the database. The second portion of each process name may be an application instance specifier or identifier (ID). In at least one embodiment, the second portion of the process name may be customized for each application instance and may be user-specified or user configurable for each process of the particular application instance. For example, there may be two different instances of the same DB application executing on the same host. The two instances may be different instances of the same vendor-provided DB application. The first DB application instance may be used for marketing by the marketing department and the second DB application instance may be used for sales by the sales department.

Figure 5:
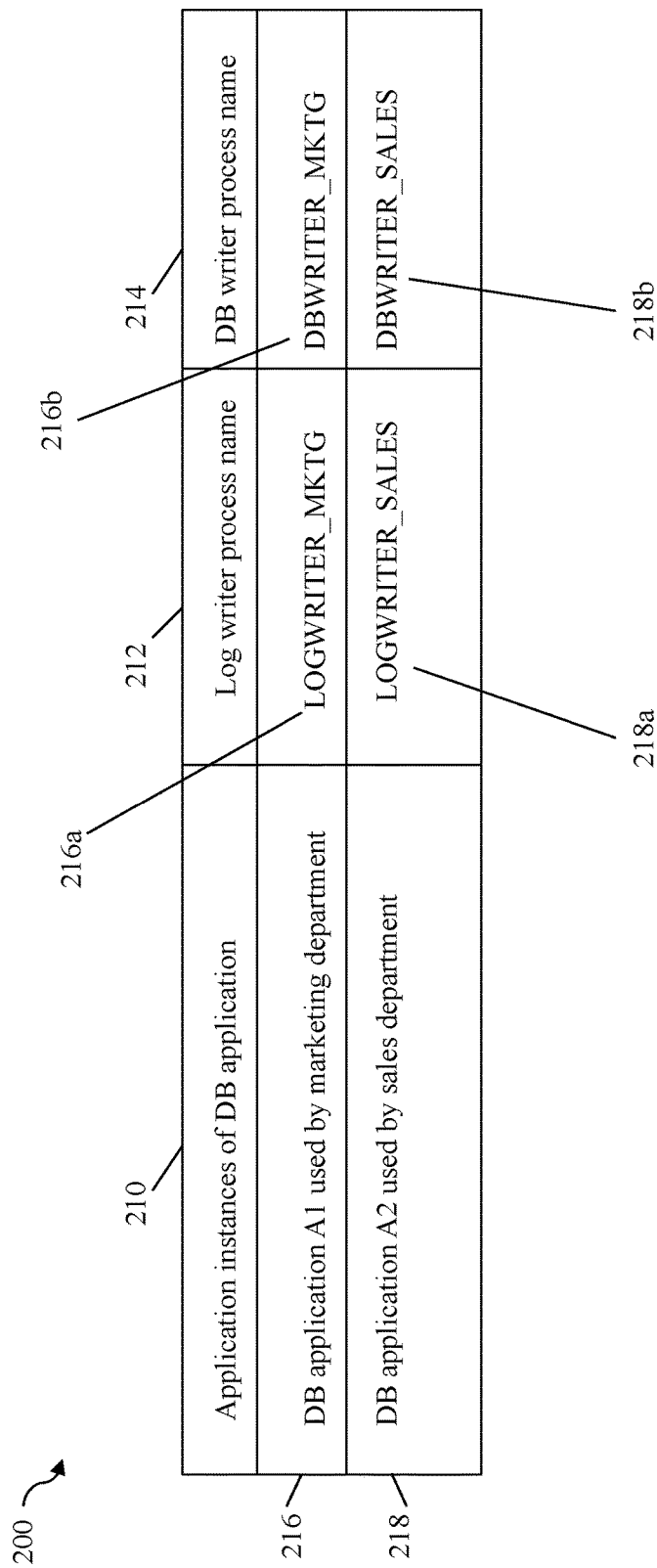

To further illustrate and referring now to FIG. 5, table 200 includes a first column 210 of application instances of the DB application, a second column 212 of log writer process names, and a third column of DB writer process names. Row 216 denotes the process names for the first DB application instance A1 and row 218 denotes the process names for the second DB application instance A2. The first instance A1 of the DB application used by marketing may have a LOGWRITER process with the process name of LOGWRITER_MKTG 216a, where "LOGWRITER" is the first portion of the process name and "MKTG" (denoting marketing) is the second portion of the LOG writer process name. The first instance A1 of the DB application used by marketing may have a DBWRITER process with the process name of DBWRITER_MKTG 216b, where "DBWRITER" is the first portion of the process name and "MKTG" (denoting marketing) is the second portion of the DB writer process name uniquely identifying the first instance of the DB application thereby enabling distinguishing between the first and second instances of the same DB application (e.g., such as between two instances of the DB application by the same DB vendor, such Oracle Corporation).

In a similar manner, the second instance A2 of the DB application used by sales may have a second LOGWRITER process with the process name of LOGWRITER_SALES 218a, where "LOGWRITER" is the first portion of the process name and "SALES" (denoting sales) is the second portion of the LOGWRITER process name. The second instance A2 of the DB application used by sales may have a DBWRITER process with the process name of DBWRITER_SALES 218b, where "DBWRITER" is the first portion of the process name and "SALES" (denoting sales) is the second portion of the DBWRITER process name uniquely identifying the second instance of the DB application (thereby enabling distinguishing between the first and second instances of the same DB application).

In this manner, the process name may include a first portion denoting the specific process of a particular application, and the second portion may further denote a particular unique instance of the specific process (as denoted by the first portion). Both DB application instances A1 and A2 are sending reads and/write I/O operations to log files and use of 216a, 218a allows for distinguishing between the particular application process instance (sales or marketing) of the LOGWRITER process of the DB application instance issuing I/Os. Similarly, both DB application instances A1 and A2 are sending reads and/or write I/O operations to the DB and use of 216b, 218b allows for distinguishing between the particular application process instance (sales or marketing) of the DBWRITER process issuing such DB I/Os.

Figure 6:
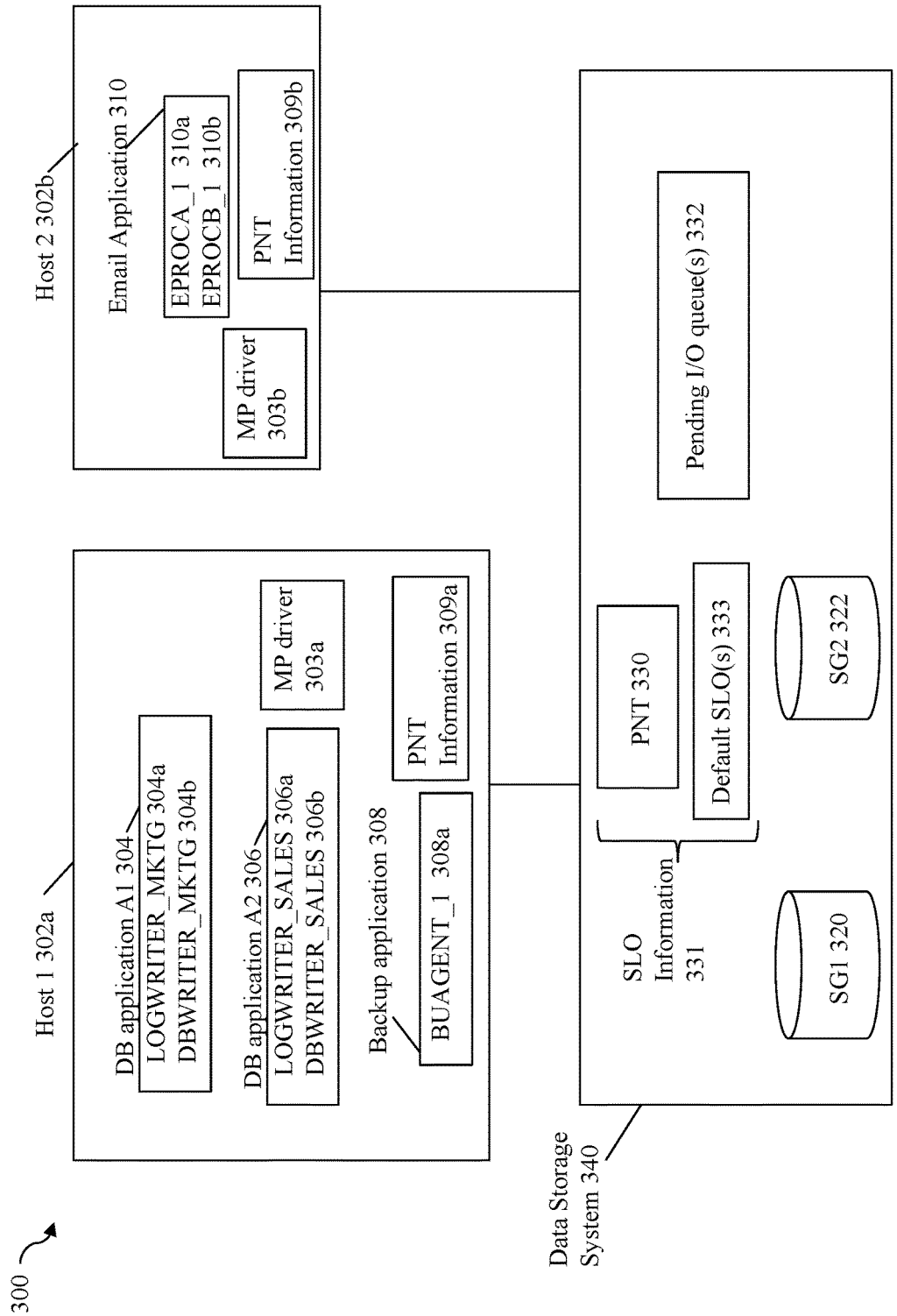

Referring to FIG. 6, shown is an example of components that may be used in an embodiment in accordance with techniques herein. The example 300 includes hosts 302a, 302b and data storage system 340, which may include additional components and may perform processing and operations as described in more detail elsewhere herein (e.g., as in connection with FIGS. 1, 2A, 2B, 3 and 4 for use in an embodiment in accordance with techniques herein). In this example, the host 1 302a may include two instances 304, 306 of the DB application such as described in connection with FIG. 5. The first instance of the DB application 304 is used by marketing and includes process 304a (having a process name like 216a) and process 304b (having a process name like 216b). The second instance of the DB application 306 is used by sales and includes process 306a (having a process name like 218a) and process 306b (having a process name like 218b). Also in this example are additional processes 308a, 310a and 310b which may have process names constructed in a manner similar to process names for 304a-b and 306a-b as discussed above in connection with FIG. 5. Host 1 302a also includes backup application 308 having the single process, BU AGENT 308a. Host 2 302b includes email application 310 having the two associated processes EPROCA_1 310a and EPROCB_2 310b. In particular, process names for each of the additional processes 308a, 310a, and 310b may include a first portion (e.g., denoting the particular application process) and a second portion (e.g., customized or configured to denote and identify the particular process instance), as described above.

The data storage system 340 includes two SGs—SG1 320 and SG2 322—each including one or more LUNs. SG1 includes LUNs used by DB application instances 304 and 306 as well as used by backup application 308. Thus, processes 304a-b, 306a-b and 308a issue I/Os directed to one or more LUNs included in SG1 320. SG2 includes LUNs used by email application 310. Thus, processes 310a-b issue I/Os directed to one or more LUNs included in SG2 322. The data storage system includes SLO information 331 comprising a process name table (PNT) 330 and default SLO information 333. Examples illustrating the PNT 330 and default SLO information 333 in more detail are discussed in following paragraphs in connection with FIG. 7. The data storage system also includes one or more pending I/O queues 332 of I/O received from hosts 302a, 302b which are waiting to be serviced or processed by the data storage system. In particular the one or more queues 332 may include I/Os issued by any of processes 304a-b, 306a0b, 308a, 310a-b where such I/Os are received by the data storage system.

In at least one embodiment, a user may specify or enter SLO information 331 (e.g., such as using a user interface, configuration file, and the like) which is stored in the PNT 330 and default SLO information 333. In at least one embodiment, the SLO information 331 may be stored on the data storage system and the MP drivers 303a-b, respectively, on hosts 302a-b may read at least a portion of the PNT 330 for use by the MP drivers 303*a*-*b*. Element 309*a* may denote the PNT information read by MP driver 303*a* for use by MP driver 303*a* in connection with tagging I/Os issued by particular processes of host 302*a*. Element 309*b* may denote the PNT information read by MP driver 303*b* for use by MP driver 303*b* in connection with tagging I/Os issued by particular processes of host 302*b*. For example, MP driver 303*a* of host 302*a* may read information from PNT 330 including process names and associated tag values for each process name on host 302*a* (where the information read by 303*a* is stored as 309*a*); and MP driver 303*b* of host 302*b* may read information from PNT 330 including process names and associated tag values for each process name on host 302*b* (where the information read by 303*b* is stored as 309*b*).

Referring to FIG. 7, shown is an example 400 illustrating in more detail information that may be stored in the PNT 330 and the default SLO information 333 for use in an embodiment in accordance with techniques herein.

PNT 330 includes the following columns of information-application 402, process name 404, host 406, tag 408 and SLO time-frame pair(s) 410. For each of the applications in column 402, the PNT 330 includes one or more associated entries where there is one entry per process name associated with the application. For example, for DB application 410, PNT 330 includes 4 entries 410*a*-*d*, respectively, for the processes 304*a*, 304*b*, 306*a* and 306*b*. For the email application 420, the PNT 330 includes two entries 420*a*-*b*, respectively, for processes 310*a*-*b*. For the backup application 430, the PNT 330 includes a single entry 430*a* for process 308*a*. Each of the entries 410*a*-*d* for a process of the DB application 410 identifies a process name 404, host 406 (upon which the process having the process name 404 executes), tag 408 (used to tag I/Os issued by the process name 404), and one or more SLO time-frame pairs 410 (identifying one or more modified SLOs for the particular process name issuing the I/O).

In connection with entry 410*a* for LOGWRITER_SALES process name, entry 410*a* indicates the process named LOGWRITER_SALES executes on host 1 (406), has associated tag value 1 (408) and has a single modified time-dependent SLO 410 where the SLO for I/Os received at the data storage system between 8 am-8 pm Monday-Wednesday has a DIAMOND level SLO.

In connection with entry 410*b* for LOGWRITER_MKTG process name, entry 410*b* indicates the process named LOGWRITER_MKTG executes on host 1 (406), has associated tag value 2 (408) and has a single modified time-dependent SLO 410 where the SLO for I/Os received at the data storage system between 8 am-8 pm Thursday and Friday has a DIAMOND level SLO.

In connection with entry 410*c* for DB WRITER SALES process name, entry 410*c* indicates the process named DB WRITER SALES executes on host 1 (406), has associated tag value 3 (408) and has a single modified time-dependent SLO 410 where the SLO for I/Os received at the data storage system any time on June 1-7 of the calendar yeast has a DIAMOND level SLO.

In connection with entry 410*d* for DBWRITER_SALES process name, entry 410*d* indicates the process named DBWRITER_MKTG executes on host 1 (406), has associated tag value 4 (408) and has a single modified time-dependent SLO 410 where the SLO for I/Os received at the data storage system any time on January 30-31 of the calendar yeast has a DIAMOND level SLO.

In connection with entry 420*a* for EPROCA_1 process name, entry 420*a* indicates the process named EPROCA_1 executes on host 2 (406), has associated tag value 5 (408) and has a single modified time-dependent SLO 410 where the SLO for I/Os received at the data storage system is always a DIAMOND level SLO.

In connection with entry 420*b* for EPROCB_1 process name, entry 420*b* indicates the process named EPROCB_1 executes on host 2 (406), has associated tag value 6 (408) and has a single modified time-dependent SLO 410 where the SLO for I/Os received at the data storage system any day between 8 am-8 pm is a BRONZE level SLO.

In connection with entry 430*a* for BUAGENT_1 process name, entry 430*a* indicates the process named BUAGENT_1 executes on host 1 (406), has associated tag value 7 (408) and has a two modified time-dependent SLOs 410 where the SLO for I/Os received at the data storage system any day between 8 am-8 pm is a BRONZE level SLO and the SLO for I/Os received at the data storage system any day between 8 pm and 8 am is a DIAMOND level SLO.

Default SLOs 333 include default SLO values used for SLOs for I/O received at the data storage system. Such default SLOs 333 may be modified or overridden by a different SLO of PNT 330 which is effective or active (e.g., for which the time-dependent SLO criteria is applicable) for a specified tagged I/O having a particular tag value. In this example, a default SLO of GOLD is specified for each of the applications (DB application, backup application and email application) and a default SLO of GOLD is also specified for each of the SGs, SG1 and SG2.

For example, MP driver 303*a* of host 302*a* of FIG. 6 may read the information in columns 404 and 408 from the PNT 330 relevant to host 1 302*a* (e.g., values of 404 and 408 from entries 410*a*-*d* and 430*a*) so that the MP driver 303*a* knows what particular tag value to place in I/Os issued by various executing processes 304*a*-*b*, 306*a*-*b* and 308*a* on the host 302*a*. To further illustrate with reference back to FIG. 6, MP driver 303*a* receives a first I/O from process name LOGWRITER_MKTG 304*a* and looks up the process name LOGWRITER_MKTG in its process name and associated tag value as stored in PNT information 309*a* and determines that the process name LOGWRITER_MKTG has an associated tag value of 1. The MP driver 303*a* then places the tag value of 1 in the first I/O prior to issuing the first I/O to the data storage system 340 for processing. In at least one embodiment using block-storage I/Os in accordance with the SCSI standard, the tag value may be placed in a command data block (CDB) header of the I/O operation. The first I/O is received by the data storage system 340 where processing is performed using the PNT 330. In particular, the data storage system retrieves the tag value of 1 from the first I/O and may use it as an index into the PNT 330 to identify the particular row 410*a* with SLO and other information associated with the tag value of 1. The processing further includes retrieving the SLO information 410 from entry 410*a* associated with tag value 1. Assume that the first I/O is received on the data storage system at 3 pm on Monday thereby making the DIAMOND SLO denoted by column 410 of entry 410*a* active or effective for the first I/O. In this case, the first I/O is processed using the elevated level of DIAMOND SLO. Otherwise, for example, if the first I/O was received at a date/time outside the specified window of 8 am-8 pm Monday-Wednesday, a default SLO may be used. In this example, a default SLO of GOLD may be obtained from 333 whereby GOLD is the SLO level of service applied or effective for the first I/O. In at least one embodiment, a default SLO may be specified for each SG, such as a first default SLO for SG1 and a second default SG for SG2. As a variation, an embodiment may specify a default SLO per application that issues I/Os. In such an embodiment, the MP driver may tag the I/O with an indicator denoting the particular application, such as DB application, which issued the I/O. As discussed above, the MP drivers are able to perform such I/O tagging with an indicator identifying the particular application such as based on process name. For example, the MP driver may know the particular first portion of each process name of each of the applications (e.g., DB application has process names with first portions of either LOGWRITER or DBWRITER). On the data storage system receiving the I/O, the indicator denoting the application may be retrieved and used to find a corresponding default application level SLO in the default SLO information 333. For example, in such an embodiment, the default SLO information 333 may specify a default SLO for each of the different application indicators that may appear in an I/O tagged with an application indicator. It should be noted that an embodiment may also include and use both the application level indicators and associated application level SLOs along with an SG level default SLO. In such an embodiment, the SG level default SLO may be used as a last fallback position for SLO determination, for example, if the I/O is not tagged with an application indicator and if the I/O is not tagged with a tag value denoting a process having an effective or active time-dependent SLO of 410 (e.g., the priority of SLO determination is to use the SLO associated with a process name. If no such SLO is effective or applicable, an application level-SLO may be used for the I/O. If no application level SLO can be determined (e.g., the I/O is not tagged with an application level indicator), then the SG-level default SLO may be used for the I/O).

Figure 8:
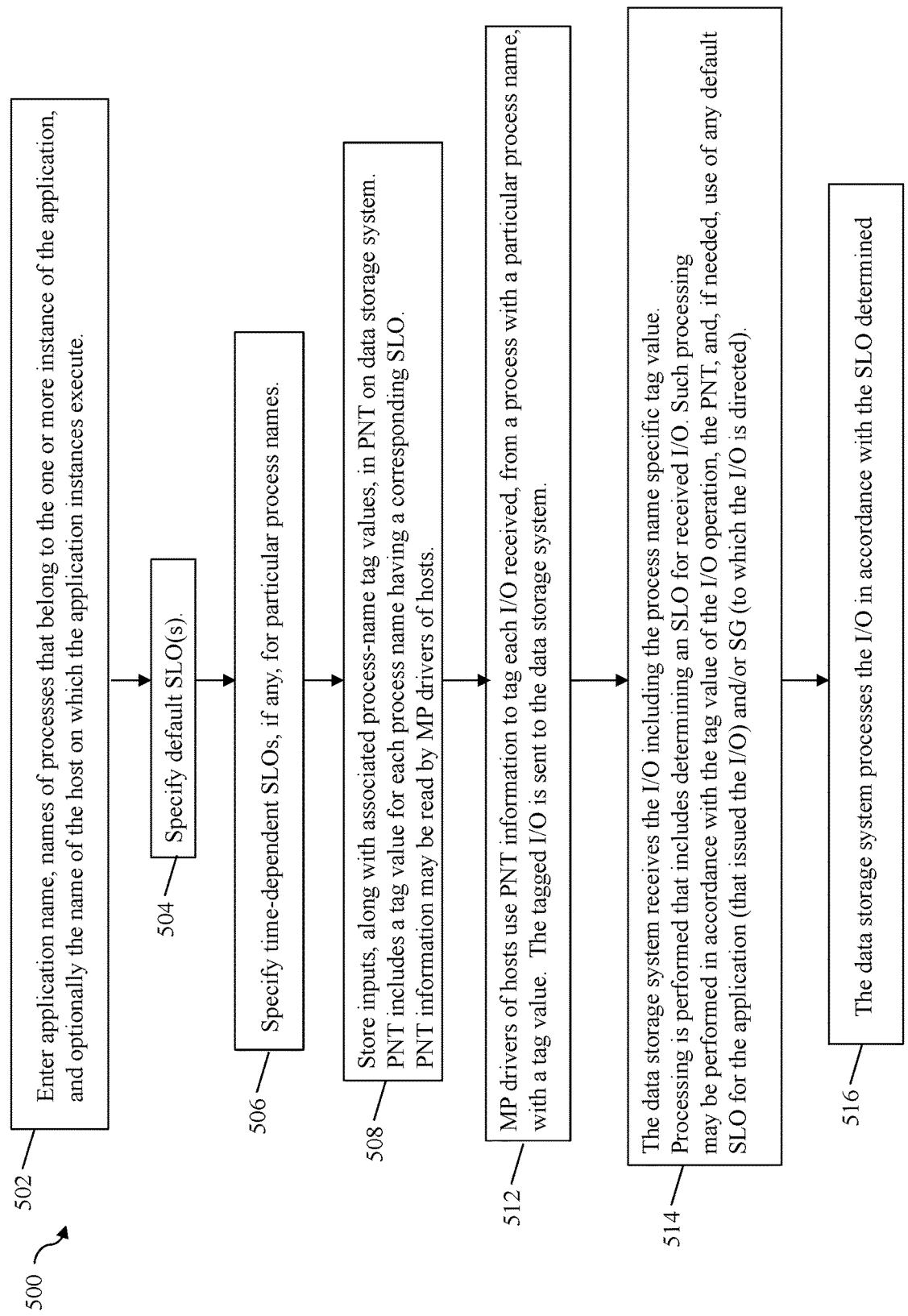
FIGS. 8, 13 and 14 are flowcharts of processing steps that may be performed in an embodiment in accordance with techniques herein.

Referring to FIG. 8, shown is a flowchart 500 of processing steps that may be performed in an embodiment in accordance with techniques herein. At step 502, a user enters each application name, the names of the processes that belong to each instance of that application and, optionally, the name of the host upon which the application instances and associated processes are running. As described above, the process name may include a first fixed or generic portion denoting the particular process of the application, and a second portion that may be configured or customized, such as by the user. The second portion may denote or differentiate between particular instances of the same process of the same application. At step 504, default SLOs may be specified. As discussed above, such default SLOs may include a default SLO for each SG and/or default SLO for each application. In at least one embodiment, such default SLOs may be used in connection with all I/Os which are not tagged with process-name specific tag values, or for I/Os for which a process-name specific tag value may not be active or effective since associated time-dependent criteria may not be met in connection with the current time at which the I/O is processed or received. At step 506, time-dependent SLOs, if any, are specified for particular process names. In connection with step 506, if a process having a particular process name requires a time variable SLO where a different customized SLO for the process name is needed at different points in time, the user specifies the process name, time frames and SLO for each time frame. For example, a first process of a particular application (where the first process has a first process name) may require (relative to the default application or SG SLO) increased performance during business hours of a particular day of the week and decreased performance (relative to the generic SLO) on weekends. In this manner, two time dependent SLOs and associated time-frames (e.g., time dependent criteria denoting when the SLO is effective) may be specified for the above-noted first process name, where a first may indicate DIAMOND SLO for increased performance during business hours of a particular day of the week and a second may indicate BRONZE SLO for decreased performance (relative to the generic SLO) on weekends. At step 408, the user inputs (from steps 502, 506 and 508 noted above) are recorded in the PNT where the PNT is stored on the data storage system and read by the MP driver on each host that sends I/Os to the data storage system. The PNT may be as described above and illustrated in connection with FIGS. 6 and 7, where the PNT includes a different unique tag for each such process name. In at least one embodiment, the tag associated with a particular process name may uniquely identify and distinguish each of the process names from the others also listed in the PNT. At step 512, an MP driver on a host receives an I/O that is issued by a particular process of an application. For each such I/O received by the MP driver, the MP driver locates the sending process name in the PNT information to obtain the corresponding unique tag for that process name. The MP driver then stores the tag value in the I/O which is then sent to the data storage system. At step 514, the data storage system receives the I/O operation including the tag representing the process name. Also in step 514, processing is performed that includes determining an SLO for the received I/O where such processing may be performed in accordance with the tag value for the process name of the I/O operation, the PNT and, if needed, use any default SLO for the application (that issued the I/O) and/or SG (to which the I/O is directed). In connection with step 514 and consistent with other discussion herein, the data storage system obtains, from the PNT, the SLO appropriate for this I/O operation based on the tag of the I/O operation. In this manner, the data storage system uses the I/O operation tag and the PNT to identify the particular application process that originated the I/O operation. The data storage system retrieves from the PNT the one or more SLOs specified for the particular tag of the I/O operation. If the PNT includes multiple SLOs specified for the single tag of the I/O operation, it means that there are time-dependent SLOs for the associated process and the data storage system further uses current time dependent information, such as time of day, day of the week, month of the year, date of the month, calendar date, and the like, to further select the appropriate SLO of the multiple SLOs associated with the tag. If no SLO from the PNT is effective or active for the received I/O, a default SLO may be used for processing the received I/O. In step 516, the data storage system processes the received I/O in accordance with the SLO determined in step 514.

In at least one embodiment, the SLO determined for an I/O may be used to determine priority for the I/O with respect to other pending I/Os waiting to be processed. In at least one embodiment, the data storage system may have a queue of pending I/Os (e.g., 332 of FIG. 6) waiting to be processed or serviced. Each I/O on the queue may have an indication of priority and the queue may be sorted or ordered based on the priority associated with each queued I/O. In at least one embodiment, the priority of each I/O may be denoted by an amount of time T associated with each I/O on the queue. The time T may denote an amount of time remaining (with respect to the current time) within which the I/O is expected to be completed to meet a specified time performance goal associated with the queued pending I/O. In at least one embodiment, a RT associated with the SLO specified for a pending I/O may be used as the time T associated with the I/O when in the queue. For example, as discussed elsewhere herein, GOLD SLO may have an associated performance goal or RT target of 3 milliseconds. The I/O is ordered or prioritized with respect to other pending I/Os based on current T values associated with the pending I/Os. An I/O with a GOLD SLO may be initially assigned a T value of 3 milliseconds and then placed in a particular position in the queue based on its T value relative to other T values of other pending I/Os.

Processing may be performed to maintain the list in the sorted order where the I/Os having the lowest associated time T are ordered as the highest priority I/Os in the queue (e.g., ordered or prioritized from lowest to highest times T associated with I/Os of the queue). At defined time intervals of elapsed time, such as every 1 millisecond, processing may be performed to decrement the associated time T for each pending I/O in the queue by the elapsed time such as 1 millisecond. Thus, those existing I/Os already in the queue may have their priority increased/adjusted as new pending I/Os are subsequently added to the queue. It should be noted that the queue of pending I/Os 332 may be implemented using any suitable data structure(s) known in the art, such as a linked list, doubly linked list, and the like. Additionally, an embodiment may further include multiple queues of pending I/Os, for example, where a different queue may be associated with each LUN (e.g., or a specified group of multiple LUNs) to which I/Os may be directed.

In connection with the foregoing, the SLO associated with an I/O received at the data storage system may be determined using the PNT table as discussed elsewhere herein. For an I/O directed to a target LUN, if there is no relevant process name tag or no effective or active process name level SLO (e.g., time at which I/O is received does not meet specified time-dependent SLO criteria), then a default SLO may be used as the time T for the I/O when placed in the queue. As described herein, the default SLO may be an application level default SLO, or an SG-specific default SLO associated with the target LUN (e.g., SG to which the target LUN belongs).

Described above are techniques for I/O tagging where the MP driver of a host may tag I/Os issued by a particular process of a particular application instance. SLO variations for the I/O are determined based on the value of the I/O tag. For example, the application may be a DB application by a particular vendor. The DB application may have one or more processes that issue I/Os. Additionally, there may be one or more instances of the same DB application. As noted above, each application process name may be encoded with information allowing the MP driver to identify the application, the application instance, and the application process that issued the I/O. The MP driver may tag I/Os with a unique tag value associated with the unique combination of the particular application, particular application instance, and particular application process that issued the I/Os.

Based on the application process name (e.g., encoded in the application process name), and thus the tag value associated with the application process name, the particular type of data or device used by the application process may also be determined. For example, as mentioned elsewhere herein, the DB application may use multiple types of data including DB data and log data. The DB data, files and/or device may include the data (e.g., content, user data) written to, and stored in, the database (e.g., database tables) managed by the DB application. The log data, files and/or device may include data denoting the recorded or logged operations performed on the DB data, files and device at various points in time. For example, log data may include records or journals of the DB data operations performed such as what DB data is deleted, modified, added, and the like. As discussed above, the DB application may include a log writer process and a DB writer process, where the log writer process writes the log data to log files or devices (e.g. LUN storing log data or log data files) and the DB writer process writes the DB data to DB data files or devices (e.g., LUN storing DB data or DB data files). Each instance of the DB application (e.g., DB application used by sales) may include a log writer process having a process name encoding or identifying the particular application process (e.g., log writer), application instance (e.g., sales) and type of data (e.g., log data) written to by the process. For example, such as described above, in connection with FIGS. 5, 6 and 7, an instance of the DB application used by sales, DB application A2, may include a log writer process named LOGWRITER_SALES, having a first portion "LOGWRITER" that identifies the particular DB application process, and having a second portion "SALES" identifying the particular DB application instance. From the first portion of the process name, LOGWRITER, as well as the tag associated with the LOGWRITER_SALES process name, the particular type of data, such as log data, used by the application process may also be determined. In this manner, the I/O tag may denote the particular application process as well as the particular type of application data (e.g., log data or DB data) used or accessed by the particular application processing have the I/O tag. Thus, generally, the I/O tag may be used by a components on the data storage system and host to distinguish between I/Os originating from different application instances and also the type of data (e.g., device usage) to which the tagged I/O is directed (e.g., whether the I/O (read or write) is directed to log data or DB data). For example, consistent with above discussion and as illustrated in FIG. 7, the I/O tag value of 1 (e.g., first row of tag column 408) and the first portion "LOGWRITER" of the application process name "LOGWRITER_SALES" (e.g., first row of process name column 404) denote the process is writing log data (as opposed to DB data); and the I/O tag value of 3 (e.g., third row of tag column 408) and the first portion "DBWRITER" of the application process name "DB WRITER SALES" (e.g., third row of process name column 404) denote the process is writing DB data (as opposed to log data). Thus, the MP driver may tag I/Os with a tag representing the particular application instance and the type of data used or accessed (e.g., log data or DB data) by the tagged I/O.

It should be noted that the DB application and the two types of data (e.g., log data and DB data) accessed or used by the application processes are examples. More generally, application process names and tags as described herein may be used with any application having one or more types of data used by the application.

Generally, I/O tagging may be used to define a variance from a base or default specified SLO, such as for an SG, data set or a LUN, storing the data (e.g., for a certain application and data type or usage such as DB data or log data) to which the tagged I/O is directed. Such I/O tagging may be used, for example, to increase the performance of the DB application on a per I/O basis for particular time frames. With respect to the overall DB application, an increase in performance denotes that the DB application has an increase in the application level transactions per second, or more generally, increased transaction rate.

A transaction may be characterized as an atomic unit of work performed within a database management system (or similar system) against a database, and treated in a coherent and reliable way independent of other transactions. A transaction generally represents any change in a database. Transactions provide an "all-or-nothing" proposition, stating that each operation of the transaction to the database must either complete in its entirety or have no effect whatsoever. For example, a transaction may include multiple I/O operations, such as multiple read and/or write operations to the DB data and log data, issued by the DB application where such I/O operations may operate on DB data. The log data may record the history of actions (e.g., DB data operations) executed for each transaction. The log data may be persistently stored and used, for example, to perform database recovery operations in the event of system restart, failure, data corruption, and the like, of the DB data.

With the DB application as described herein (e.g., in connection with FIG. 6 and elsewhere), the log data and the DB data may be stored on PDs of the data storage system, where the PDs provide physical non-volatile storage in the data storage system. In a typical DB application using log data and DB data, the one or more operations performed for a transaction may be recorded (e.g., written) in the log data prior to committing the transaction where the one or more operations, such as writes, are issued with respect to the DB data. Thus, for the DB application transaction, the log data is written prior writing or updating the DB data. One way in which DB application performance may be increased (e.g., to increase the transaction rate such as the number of transactions per second) is to increase the SLO of the log data. I/O tagging may be used, for example, to specify temporary SLO changes for I/Os to the log data for a particular DB application instance, such as a temporary decrease in SLO in efforts to increase performance of the particular DB application instance.

To increase DB application performance (e.g., increase application level performance such as increasing the DB application transaction rate), some DB applications may provide a configuration option for in-memory database configuration rather than on-disk database configuration. When the DB application is configured with the on-disk database configuration, the DB data and log data may be stored on PDs of the data storage system such as noted above. The on-disk configuration for the DB application may be contrasted with the in-memory configuration for the DB application. With in-memory configuration, all, or selected portions of, the DB data are stored in memory where such DB data may, or may not, be further persisted to other non-volatile storage. With the in-memory configuration, the DB data may be stored in RAM or some other form of volatile memory. In at least one embodiment where the DB application has the in-memory DB configuration, the DB data may be stored in memory of a host system upon which the DB application executes.

Figure 9:
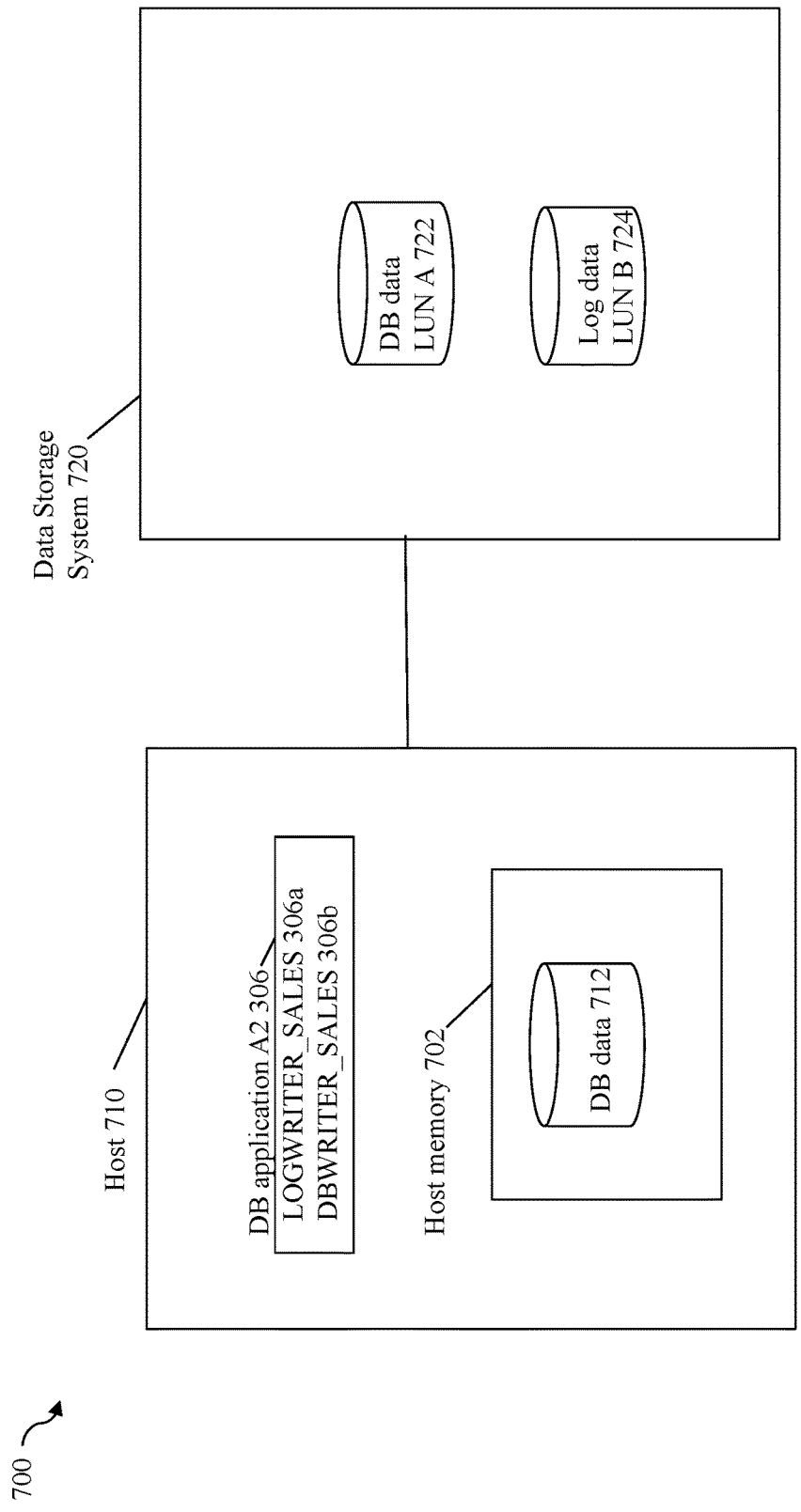
FIG. 9 is an example illustrating an in-memory database in an embodiment in accordance with techniques herein.

Referring to FIG. 9, shown is example 700 illustrating an in-memory configuration for a DB application instance in an embodiment in accordance with techniques herein. The example 700 includes host 710, data storage system 720 and DB application 306 executing on the host 710. The host 710, data storage system 720, and DB application 306 may be as described elsewhere herein, such as in FIG. 6. Elements 722 and 724 may denote LUNs of data stored on non-volatile backend physical storage PDs of the data storage system 720. Additionally, the host 710 includes host memory 702. Host memory 702 may be, for example, RAM or other form of volatile fast memory. DB application 306 may write DB data and log data as discussed herein. In particular process 306a may write the log data and process 306b may write the DB data. In this example, the DB application 306 may be configured as an in-memory database in which all, or at least some of, the DB data 712 is stored in the host memory 702. Memory 702 may be used, for example, for host-side data caching as well as for storing the DB data 712 used by DB application 306. With the in-memory configuration, the process 306b of the DB application 306 writes to the in-memory DB data 712 stored in the host memory 702. In this example, the log data user by the DB application 306 may be stored on the log data LUN B 724 of the data storage system 720. Thus, when performing a transaction for DB application 306, write operations of the transaction may be recorded (e.g., written) in log data 724 by process 306a, and then the transaction may be committed where the process 306b issues the write operations to the DB data 712 stored in host memory 702. In this example 700, the log data 724 for the DB application 306 may be stored persistently on non-volatile storage PDs of the data storage system 720. In the event of a power failure or other event in which the host 710 loses power, the data stored in host memory 702 is lost due to the volatility and non-persistent nature of the host memory 702. In this case, the log data 724 may be used to recover and restore the contents of the in-memory DB data 712. In at least one embodiment, the DB data 712 may be periodically flushed asynchronously to the data storage system 720 and stored on LUN A 722 (e.g., non-volatile storage PDs). Thus, the host memory 702 may include the most up to date copy of the DB data where committing a transaction means performing any writes of the transaction to the DB data 712 of host memory 702. At various points in time, flushing of the DB data 712 from host memory 702 may be performed whereby any updates made to DB data 712 since the last or most recent flushing of 712 may be sent to the data storage system 720 and then applied to DB data LUN A 722. With the on-disk database, there is no in-memory database stored in the host memory 702. With the on-disk database, committing a transaction means performing any writes of the transaction to the DB data 722 as stored on the data storage system 720.

In the example 700, a first default or base SLO may be specified for DB data LUN A 722 and a second default or base SLO may be specified for log data LUN B 724. I/O tagging as described herein may be used to vary the SLO, per I/O, for one or both of 722 and 724. The data storage system may allocate or reserve data storage system resources for use with LUN A 722 in accordance with the first SLO, and may allocate or reserve data storage system resources for use with LUN B 724. For example, the first SLO for LUN A 722 may be GOLD (e.g., 3 ms. average I/O RT as described above), and the second SLO for LUN B 722 may also be GOLD (e.g., 3 ms average I/O RT). Responsive to specifying GOLD level SLOs for LUNs 722, 724, the system 720 may allocate or reserve resources for use in connection with servicing I/Os directed to LUNs 722, 724. The amount of resources allocated or reserved may vary with the target SLOs for LUNS 722, 724. Generally, higher RT SLOs denoting lower performance RT targets result in less resources allocated and utilized for I/Os; and lower RT SLOs denoting higher performance RT targets result in more resources allocated or utilized for I/Os. For example, the data storage system 720 may allocate an amount of cache for storing cached write data, assign I/Os priority for servicing, and allocate an amount data bandwidth from one or more front end ports of HAs of the data storage system based on the specified 3 ms. RT for the GOLD SLO level (where such HA ports service I/Os directed to LUNs 722, 724). Such allocations may be made in order to meet the specified 3 ms. I/O RT target. Reducing performance goals or targets may be specified by increasing the SLOs further (e.g., increasing target I/O RT) for LUNs 722, 724, such as to SILVER using I/O tagging, which result in the data storage system reducing the amount of resources allocated or reserved for use with the LUNs 722, 724 (e.g., reduced I/O target performance means less resources may be needed to meet the target SLO). Increasing performance goals or targets may be specified by reducing the SLOs further (e.g., decreasing target I/O RT) for LUNs 722, 724, such as to DIAMOND using I/O tagging, which result in the data storage system increasing the amount of resources allocated or reserved for use with the LUNs 722, 724 (e.g., increased I/O target performance means additional resources may be needed to meet the target SLO).

With such an in-memory configuration of DB application 306 as illustrated in FIG. 9, improving the I/O RT performance of the log data 724 (e.g., by lowering the SLO for 724) such as using I/O tagging to increase tagged I/O SLOs results in tagged writes to the log data 724 being completed sooner, whereby the writes to DB data 712 may also be committed sooner, and whereby the transaction rate for the DB application 306 further increases. However, with an in-memory configuration of the DB application 306 as in FIG. 9, modifying (e.g., increasing or decreasing) the SLO for the DB data LUN A 722 may not result in a meaningful change (e.g., more than a specified amount of change or variation) in the DB application 306 performance. In other words, with an in-memory configuration of the DB application 306 as in FIG. 9, changes to the SLO for the DB data LUN A 722 may not result in a meaningful impact (e.g., more than a specified amount of change or variation) in the DB application 306 performance (e.g., as measured in transactions per second for the DB application 306).

With an in-memory configuration of the DB application 306 as in FIG. 9, SLO changes to the SLO for DB data LUN A 722 may not significantly impact performance of DB application 306 since the DB data 712 is stored in the host memory 702 and only periodically written asynchronously to LUN A 722. For example, reducing the SLO performance level for DB data LUN A 722 from GOLD to SILVER (while LUN B 724 remains at GOLD) may not adversely affect performance of DB application 306 because transaction committed data is written to DB data 712 in host memory 702 that is asynchronously periodically written to DB data LUN722.

In contrast to the in-memory configuration of the DB application 306 as in FIG. 9, assume the DB application 306 is configured as on-disk whereby the DB data 712 is not stored in the host memory 702 and each transaction and write to the DB data is done directly to DB data LUN A 722 on the data storage system. With the on-disk configuration of DB application 306, SLO changes to the SLO for DB data LUN A 722 will have a more direct and significant impact on performance of DB application 306 (than with the in-memory configuration as in FIG. 9).

As such, it may be beneficial to overall data storage system performance to reduce, minimize, and/or make available resources of the data storage system which may not be needed for servicing I/Os of the DB data LUN A 722 when the DB application 306 is configured with the in-memory configuration option (e.g., configured as an in-memory database rather than as an on-disk database). In other words, with the in-memory configuration of the DB application 306 of FIG. 9, the target RT of the SLO for LUN A 722 may be increased/service or performance level decreased, such as from GOLD to SILVER, without adversely impacting the performance of DB application 306. In this case, the data storage system may reduce the amount of resources allocated or reserved for servicing I/Os directed to DB data LUN A 722 thereby making such resources now available for other uses in the data storage system. However, if the DB application 306 is configured as an on-disk database, it may not be desirable to modify or reduce the SLO target performance for LUN A 722 from GOLD to SILVER since this would likely adversely impact performance of DB application 306.

In at least some DB applications, the DB application configuration may change dynamically between in-memory configuration and on-disk configuration. For example, the DB application may be initially configured at a first point in time as an in-memory database and may later change at a second point in time to the on-disk configuration. Subsequently, at a third point in time, the DB application may again be reconfigured as an in-memory database. Such a reconfigurations may be performed dynamically in a manner that is transparent to the data storage system. Such configuration changes may occur at various points in time depending on the needs of the particular DB application and the classification or use of DB data.

It may be desirable to be able to automatically detect whether a DB application instance is configured as an in-memory database or an on-disk database. Furthermore, it may be desirable to automatically detect when the DB configuration has changed from in-memory to on-disk, or has changed from on-disk to in-memory. Accordingly, described in following paragraphs are techniques that may be used to automatically detect whether the DB application instance is configured as an in-memory database or an on-disk database, and may also provide for automatically detecting when the DB configuration has changed from in-memory to on-disk, or has changed from on-disk to in-memory.

In at least one embodiment, the data storage system may monitor and record statistics per DB application instance based on tagged I/Os. Using such statistics, I/O profiling may be dynamically performed and processing may determine whether the DB application is configured as an in-memory or on-disk database. If it is determined that the DB application is configured as an in-memory database, for a tagged I/O directed to DB data, processing may be performed to specify a higher target I/O RT in the SLO associated with the DB data thereby indicating a reduction in target I/O performance for the DB data and also allowing the data storage system to reduce the system resources allocated and utilized in connection with servicing I/Os directed to the DB data. Such a reduction in target I/O performance for tagged I/Os directed to the DB data of an in-memory database may not significantly adversely impact the DB application performance (e.g., transaction rate). Rather, it may be expected that the reduction in target I/O performance for the DB data of an in-memory database (e.g., by raising its associated SLO) may result in the DB application performance maintaining its current performance (e.g., within a specified threshold or tolerance).

If it is determined that the DB application is configured as an on-disk database, for a tagged I/O directed to DB data, processing may be performed to decrease the target RT I/O of the SLO associated with the DB data thereby indicating an increase in target I/O performance for the DB data. The decrease in target RT of the SLO and thus increase in target I/O performance for the DB data may be specified, for example, using tagged I/Os as described herein. Such a decrease in the target RT of the SLO, and thus an increase in target I/O performance, for the DB data may result in an overall increase in the DB application performance (e.g., transaction rate) since the DB application is configured as an on-disk database rather than an in-memory database.

When the DB application is configured as an in-memory database, the DB application performance is generally not sensitive or responsive (e.g., within specified limits) to changes in target I/O RT SLO for the DB data. However, when the DB application is configured as an on-disk database, the DB application performance is generally sensitive or responsive to changes in target I/O RT SLO for the DB data. The foregoing and other aspects of the techniques are described in more detail in following paragraphs.

As mentioned above, the same DB application may be used in a variety of different applications or data usage scenarios that may vary, for example, with the particular classification or category of DB data stored in the database or how the DB data stored in the database is used. For example, the DB application may be used to store content (e.g., as DB data in database tables) for OLTP (online transaction processing), a DSS (decision support system) or data warehouse, or a Telco (telecommunications) application or usage. An I/O profile of an application, such as the DB application, may be defined as the general pattern, type and/or characteristics of I/Os issued. The I/O profile may vary with one or more factors. For example, the particular I/O profile may vary with application, such as whether the application is the DB application, an email application, and the like. Furthermore, the I/O profile for an application instance, such as the DB application, may vary with the classification or category of DB data used by (e.g., stored and accessed using) the DB application. Generally, one or more other factors, such as the particular operating system upon which the DB application executes, may also affect the I/O profile. Thus, the same application instance, such as the same DB application instance 306, may have observed I/O patterns matching different runtime I/O profiles that vary depending on what classification or category of DB data (e.g., OLTP, DSS, Telco) is stored with the DB application instance at different points in time. Depending on the classification of data or manner in which the DB application is used, and thus depending on the current I/O pattern exhibited by the DB application at a point in time, it may be more desirable or beneficial to use either the in-memory database or the on-disk database. In at least one embodiment, whether the DB application instance is configured as an in-memory or on-disk database may be determined in accordance with the currently detected I/O profile or pattern of the DB application instance's observed I/O workload. In such an embodiment, whether the DB application instance is configured as an in-memory or on-disk database may be inferred from, or explicitly specified, for each of the different I/O profiles matching the application's current observed I/O pattern.

Figure 10:
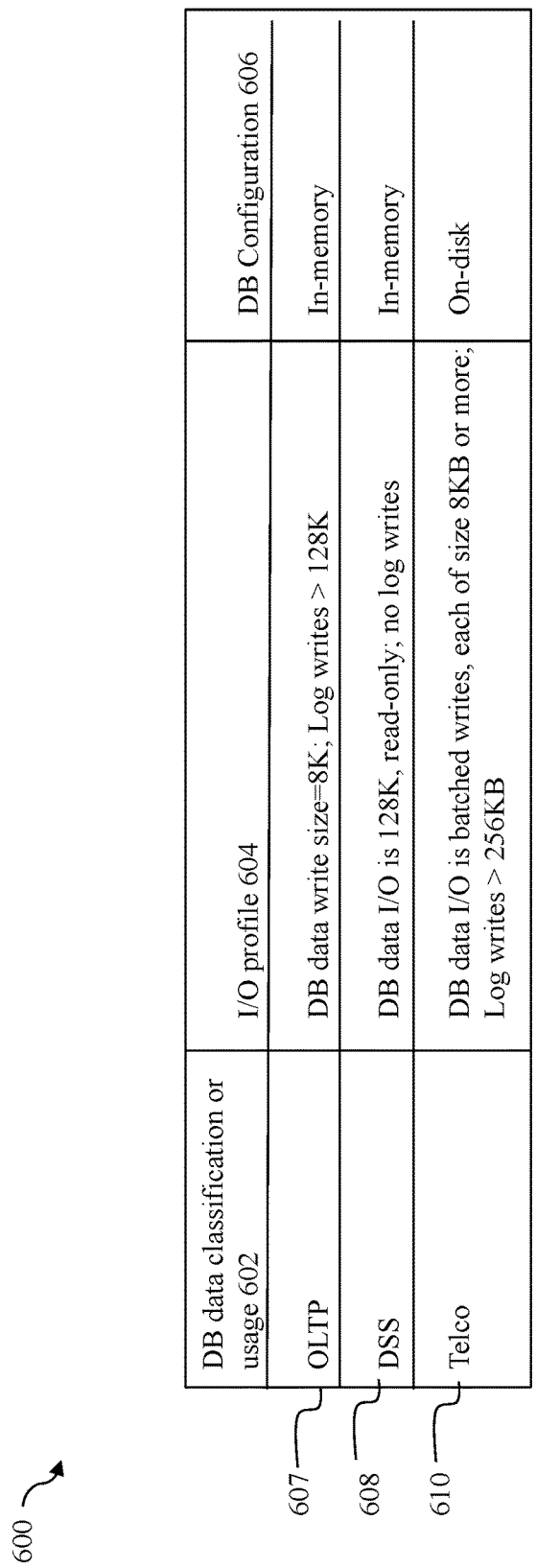
FIG. 10 is an example of I/O profiles and DB configurations option settings for different DB data classifications in an embodiment in accordance with techniques herein.

Referring to FIG. 10, shown is an example 600 of different I/O profiles and configuration options that may be associated with different DB data classifications or usages (of DB data stored with an instance of the DB application) in an embodiment in accordance with techniques herein. The table 600 includes the following columns: DB data classification or usage 602, I/O profile 604 and DB configuration 606 (e.g., denotes whether the DB application is configured for either an in-memory or on-disk database). Each row of the table denotes the I/O profile 604 and DB configuration 606 for the particular DB data classification or usage 602 of the row.

Row 607 indicates the I/O profile and DB configuration when the DB application is used for the OLTP DB data classification. For OLTP as denoted by column 604 of row 607, the expected I/O profile is generally DB data writes of a specified uniform size, such as 8K, and log writes are typically larger than 128 KB. When the DB application is used for OLTP data, column 606 of row 607 indicates that the DB application is configured as an in-memory data base. In at least one embodiment, column 606 may identify the expected DB configuration of in-memory or on-disk database based on best practices or recommendations of the DB application vendor. Thus, in at least one embodiment, the configured option of in-memory or on-disk (column 606 values) for each of the different DB data classifications or usages may be expected, inferred or implied based on the detected I/O profiles also associated with the DB data types or usages. As a variation, an embodiment may also set the configured option of in-memory or on-disk (column 606 values) for each of the different DB data classifications or usages based on user-specified values or selected options (which may or may not match those of best practices).

Row 608 indicates the I/O profile and DB configuration when the DB application is used for DSS purposes/DSS DB data classification. As known in the art, DSS denotes that the DB data is used as mostly a read-only database such as for creating and generating reports. As such, when the DB application is used for DSS data, column 604 or row 608, denotes that the I/O profile is read-only I/Os for the DB data of a specified size, such as 128K. Since the DB data I/Os are primarily are all reads with DSS, there are no log writes (or an insignificant number of log writes, if any). When the DB application is used for DSS data usage, column 606 of row 608 indicates that the DB application is configured as an in-memory data base. An in-memory database for DSS may provide for fast I/O response times. Additionally, since the I/Os are all, or primarily read-only, in the event of a power failure on the host whereby the contents of the in-memory database stored in the host memory (e.g., volatile memory) are lost, there is generally no loss of DB write data (e.g., no need to reconstruct (from the DB log data) lost write data that had been stored in the in-memory database upon power failure where the write data was not flushed to the data storage system prior to power failure).

Row 610 indicates the I/O profile and DB configuration when the DB application is used for the Telco or telecommunications DB data classification, such as records of phone call data. As such, the Telco data usage scenario is generally writes to the DB data and also writes to the log data. When the DB application is used for Telco data, column 604 or row 610, denotes that the I/O profile is primarily batches of DB data writes where each such batched DB data write has a size of 8 KB or more and log writes are more than 256 KB. When the DB application is used with Telco data, column 606 of row 610 indicates that the DB application is configured as an on-disk data base. With Telco data usage, an in-memory database configuration may provide for quicker I/O response times. However, in at least one embodiment, a decision may be made not to risk the possible data loss in the event of a host power failure (e.g., which would require reconstructing (from the DB log data) any lost write data).

In at least one embodiment, when configured for in-memory database, all DB data of the DB application instance may be stored in the host memory 702. Alternatively, when configured for in-memory database, selected portions of less than all DB data of the DB application instance may be stored in the host memory 702. Such selected portions may be, for example, that data which requires very quick I/O RT when performing reads and/or writes. Thus, in some embodiments, some of the DB data may be stored in an in-memory database and some of the DB data is stored in an on-disk database. In this latter case in at least one embodiment, the DB configuration option 606 may indicate that the DB application instance is configured as on-disk if any portion of the DB data is configured as on-disk (e.g., to avoid possible adverse DB application performance impact if the DB data target I/O performance is decreased by increasing the DB data SLO).

Figure 11:
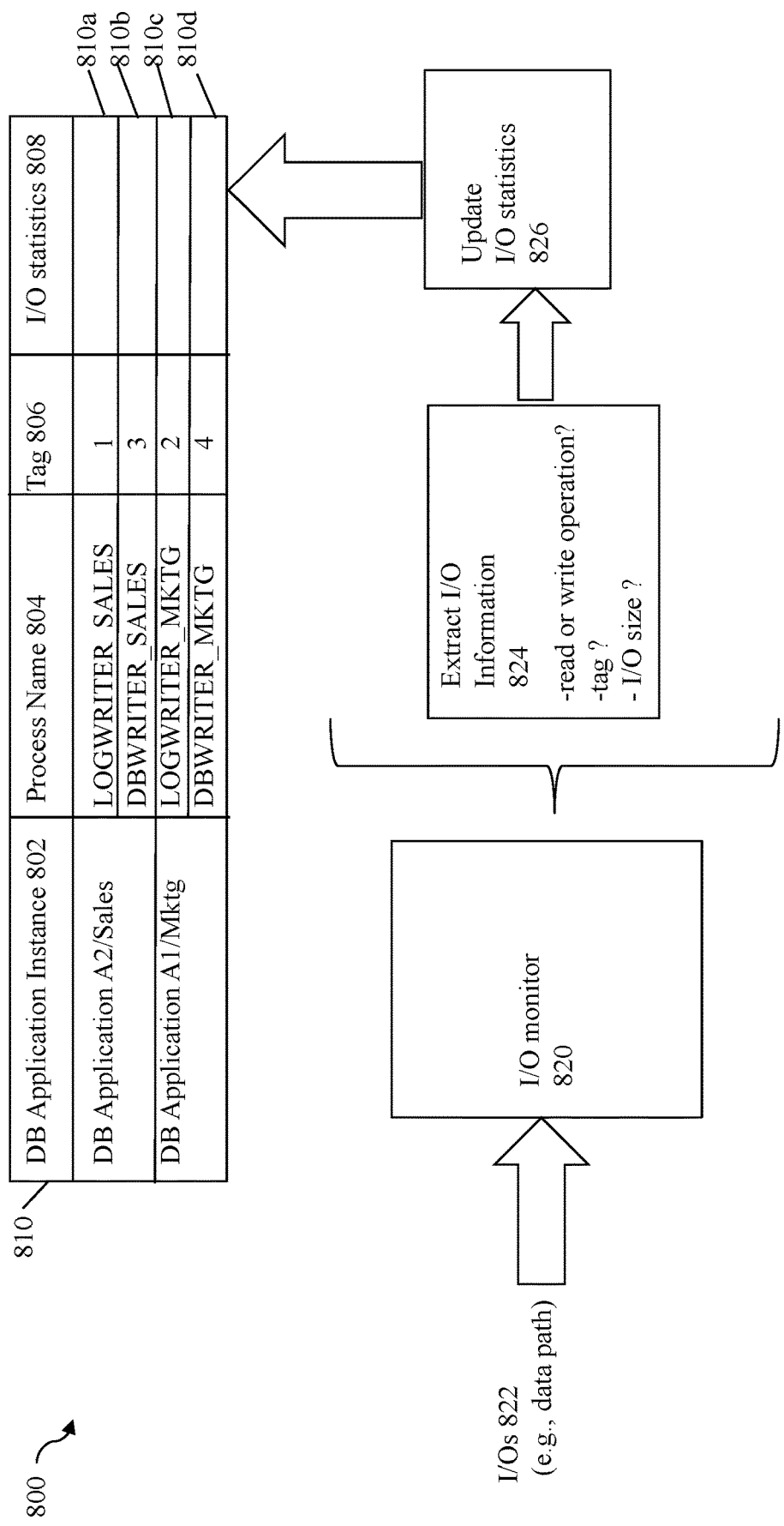
FIGS. 11, 12A and 12B are examples illustrating data flow, data and components that may be used in an embodiment in accordance with techniques herein.

Referring to FIG. 11, shown is an example of an I/O monitor and I/O statistics that may be used in an embodiment in accordance with techniques herein. The example 800 includes an I/O monitor 820 that may be a process or other code entity. The I/O monitor 820 generally monitors I/Os 822 received over the data or I/O path on the data storage system. The I/O monitor 820 first extracts information 824 regarding the received I/Os and then updates 826 the I/O statistics of table 810 collected for the different application processes/tag values.

The received I/Os 822 may be tagged I/Os each including a tag value and an SLO as discussed elsewhere herein. The information extracted 824 may include whether the I/O is a read or write operation, the I/O tag value of the I/O operation and the I/O size characteristics (e.g., amount of data read or written by the I/O operation). The I/O tag value may be one of the predetermined I/O tags such as illustrated and described in connection with FIG. 7 above. As discussed above, a different unique tag value may be associated with, and identify, the particular process of an application instance that originates or issues the received I/O including the tag value. As such, the tag value may denote the process of the application instance, the application instance, and also whether the process is accessing log data or DB data (e.g. which type of application data or device is being read or written). For example, element 810 is a table of the collected I/O statistics for each tag value. The table 810 includes the following columns: DB application instance 802, processing name 804, tag 806 and I/O statistics 808. Each row of the table 810 denotes I/O statistics collected 808 for a particular tag value 806 have an associated process name 804 and an associated DB application instance 802. Thus, the tag value extracted from the I/O may be used as an index into the table 810 to locate a row of the table. The additional extracted I/O information regarding the I/O operation, such as whether the I/O is a read or write, and the size of the I/O, may be incorporated into the I/O statistics 808 of the located row for the extracted tag value. In this manner, the I/O monitor 820 records extracted information regarding the received I/Os in different sets of I/O statistics for the different application instances as well as the processes of each such application instance. For example, rows 810a and 810b includes I/O statistics for, respectively, writes performed to the log data and DB data for the DB application instance A2 for sales; and rows 810c and 810d includes I/O statistics for, respectively, writes performed to the log data and DB data for the DB application instance A1 for marketing (e.g., MKTG).

Based on the I/O statistics collected for the log data and DB data for the DB application instances A1 and A2, processing may be performed to determine matching I/O profiles (e.g., that matches the I/O statistics of the DB application instances) as will now be described with reference to FIG. 12A.

Figure 12A:
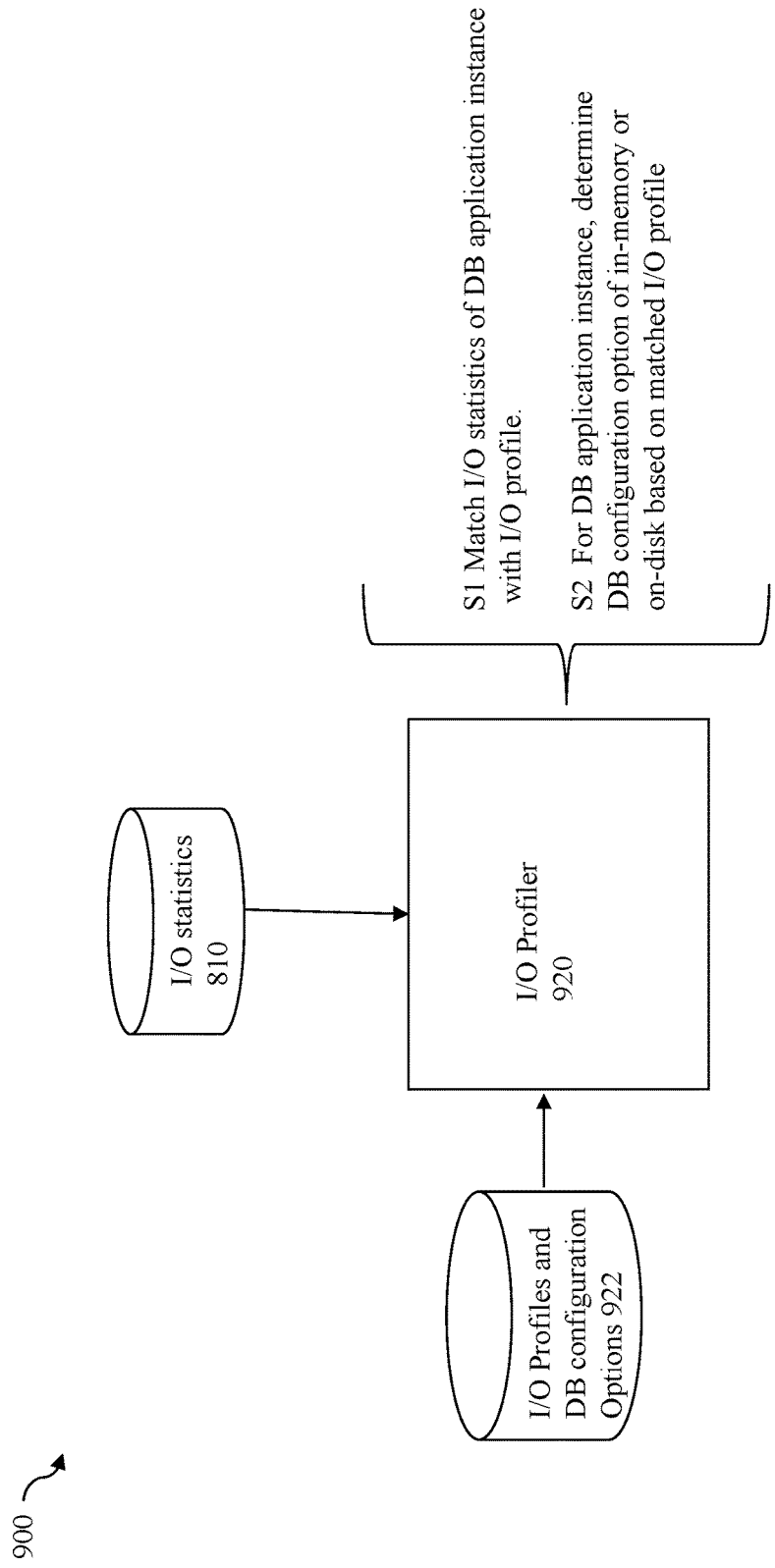

Referring to FIG. 12A, shown is an example 900 illustrating components, data flow and processing that may be performed in an embodiment in accordance with techniques herein. The example 900 includes I/O profiles 920, I/O profiles and DB configuration options 922, and I/O statistics 810. Element 810 may denote the same information as in table 810 of FIG. 11. Element 922 may denote the information from table 600 of FIG. 10. The I/O profiler 920 reads in the I/O statistics 810 for each DB application instance A1/marketing and A2/sales and compares the I/O statistics collected for each DB application instance to the different I/O profiles of 922 to determine whether there is a match between the I/O statistics collected for the DB application instance and I/O pattern of an I/O profile (S1). For example, consider DB application instance A2/sales and assume that rows 810a and 810b denote a first set of the collected I/O statistics 810 indicating that DB data writes are of size 8K and that log writes are greater than 128K. The I/O profiler 920 may search the I/O profiles of 922 (e.g., rows of table 600 of FIG. 10) to determine whether the foregoing first set of collected I/O statistics matches any I/O patterns of a defined I/O profile. In this example, the processing may determine that the collected I/O statistics for DB application instance A2/sales matches the I/O pattern denoted by the I/O profile 604 of row 607 for OLTP. Subsequently, for the DB application instance A2,sales, the I/O profiler 920 determines the DB configuration of in-memory or on-disk based on the matched I/O profile (S2). For example, for the DB application instance A2/sales, the I/O profiler 920 may then examine the table row 607 to extract the particular option value in the DB configuration column 606, since this option value in row 607 denotes the DB configuration option selection or setting for OLTP. Continuing with this example, column 606 of row 607 indicates that the DB configuration option is in-memory for OLTP. Processing performed as just described has monitored I/O operations and collected I/O statistics regarding such I/O operation per application instance. The collected I/O statistics 810 denote the observed I/O pattern for the application instance. In step S1, the I/O profiler determines a match between an I/O pattern of an existing I/O profile and the observed I/O pattern for the application instance. In step S2, based on the matched I/O profile of row 607, the I/O profiler then determines the DB option of in-memory or on-disk. As described below, FIG. 12A processing may be performed at different points in time to reassess the currently observed I/O pattern of an application instance and determine a matching I/O profile in efforts to dynamically detect changes in the DB data classification or usage and also changes to the configuration of in-memory or on-disk database configuration.

Figure 12B:
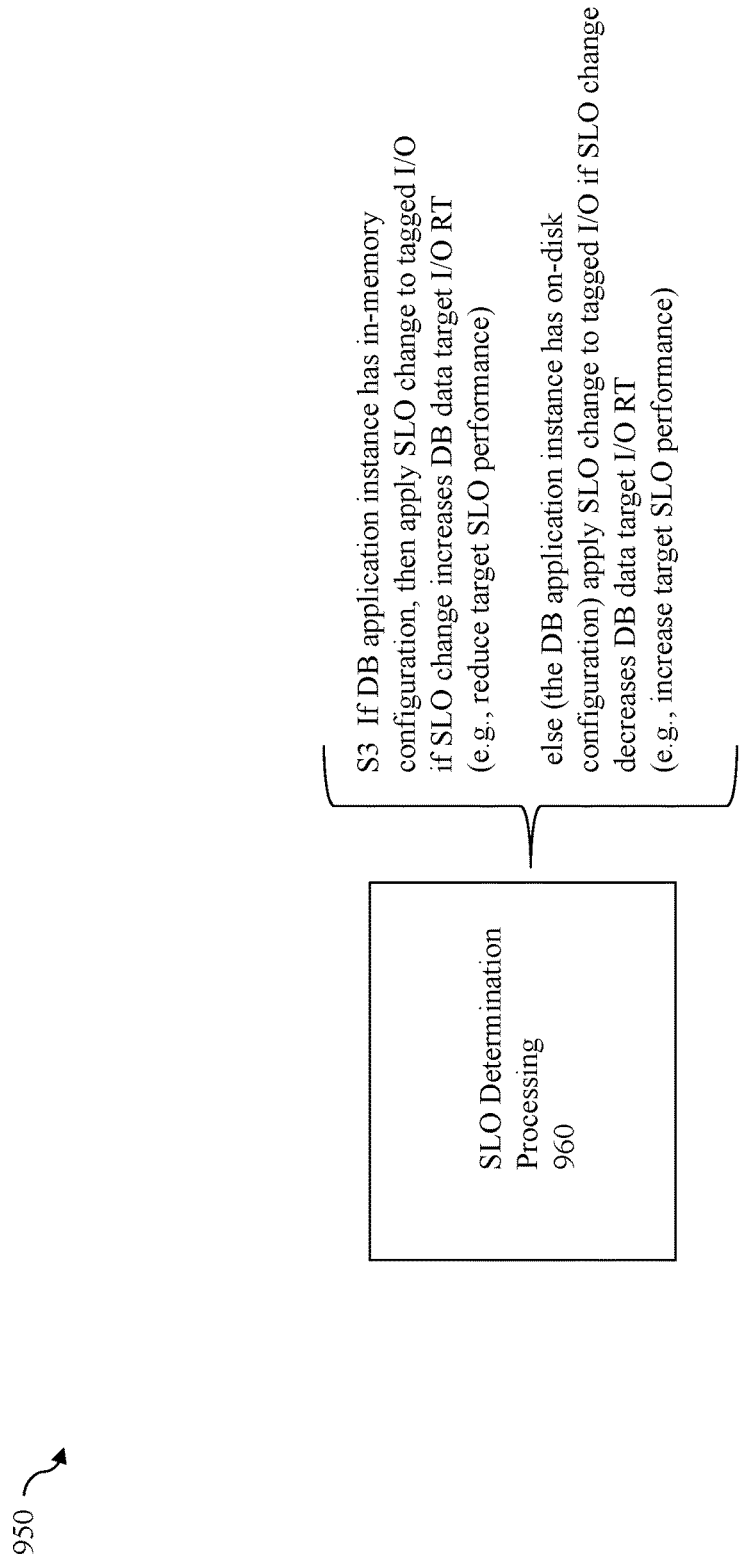

Referring to FIG. 12B, shown is an example 950 of processing that may be performed in an embodiment in accordance with techniques herein. The example 950 includes SLO determination processing 960 that may be performed subsequent to the processing of steps S1 and S2 of FIG. 12A. Step S3 may be performed as part of SLO determination processing for each tagged I/O received for an application instance (e.g., DB application instances A1/Mktg and A2/Sales) where the tagged I/O is directed to the DB data (not the log data) for the application. In step S3, if the DB application instance has in-memory database configuration (as previously determined in S2), then the target I/O RT for the DB data may be increased (e.g., reduce target SLO performance). Otherwise, the DB application instance has on-disk database configuration and processing may decrease the target I/O RT for the DB data (e.g., increase target SLO performance).

In at least one embodiment, the SLO used in S3 when the DB application instance is configured as an on-disk database may be obtained from the PNT 330 for the DBWRITER process of the DB application instance. For example, for DB application instance A2/sales, assume that the current SLO for the DB data is GOLD and that the DB application instance A2/sales is configured as an on-disk database. In this case, S3 may include examining the PNT table 330 as in FIG. 7 and determining whether the PNT specifies any SLO time-frame pairs 410 for the DB data of the DB application instance A2/sales. As described above, the process name denotes both the application and the type of data (e.g., log data or DB data) accessed (e.g., written to) by the process. Thus, the process name DBWRITER_SALES with tag 3 identifies the process of DB application instance A2/sales that writes to the DB data. The PNT row 410c specifies an SLO of DIAMOND that should be applied to tagged I/Os from June 1-7. Assume that the current date is within June 1-7 and the DIAMOND SLO is therefore effective and, if applied to a tagged I/O, would increase the DB data SLO target performance from GOLD to DIAMOND. In accordance with techniques herein, when the DB application instance A2/sales is configured as an on-disk database, S3 processing may set the SLO for the DB data for the application instance to DIAMOND (based on the PNT table). In the event that the PNT row 410c does not specify an SLO that, if applied, would increase the DB data target SLO performance, then no SLO change may be applied in connection with tagged I/Os. For example, it may be that the only SLO change specified in the PNT is to lower performance/increase the target I/O RT for the DB data for DB application instance A2/sales from GOLD to BRONZE. In this case, assuming the DB application is configured as on-disk, processing herein would not apply the SLO change in at least one embodiment in accordance with techniques herein.

Alternatively, assume the DB data of DB application instance A2/sales has the current SLO of GOLD and that the DB application instance A2/sales is configured as an in-memory database. Based on S3, the SLO change increasing SLO performance for the DB data to DIAMOND (as denoted in column 410 of row 410c) should not be applied for tagged I/Os since the DB application instance A2/sales is configured as an in-memory database. In this case, S3 does not apply the SLO change from GOLD to DIAMOND (as indicated in column 410). Additionally, the PNT row 410c does not specify an SLO that, if applied, would decrease the DB data target SLO performance (e.g., no SLO of SILVER or BRONZE), so no SLO change may be applied to tagged I/Os for the in-memory configuration. If, however, the PNT row 410c specified an SLO change/performance reduction from GOLD to SILVER or GOLD to BRONZE, then such an SLO change would be applied to I/Os tagged in connection with S3 for the in-memory configuration.

Such processing as described in connection with FIGS. 11, 12A and 12B may be repeated to dynamically reassess the observed I/O pattern for each application instance. The data storage system may perform I/O monitoring of FIG. 11 in an ongoing manner to maintain running I/O statistics for each application instance. In this way, the I/O statistics collected may change over time to reflect any changes in I/O pattern of I/Os issued by the DB application instance. The processing of FIGS. 12A and 12B may be performed at various points in time, such as responsive to receiving tagged I/Os.

Figure 13:
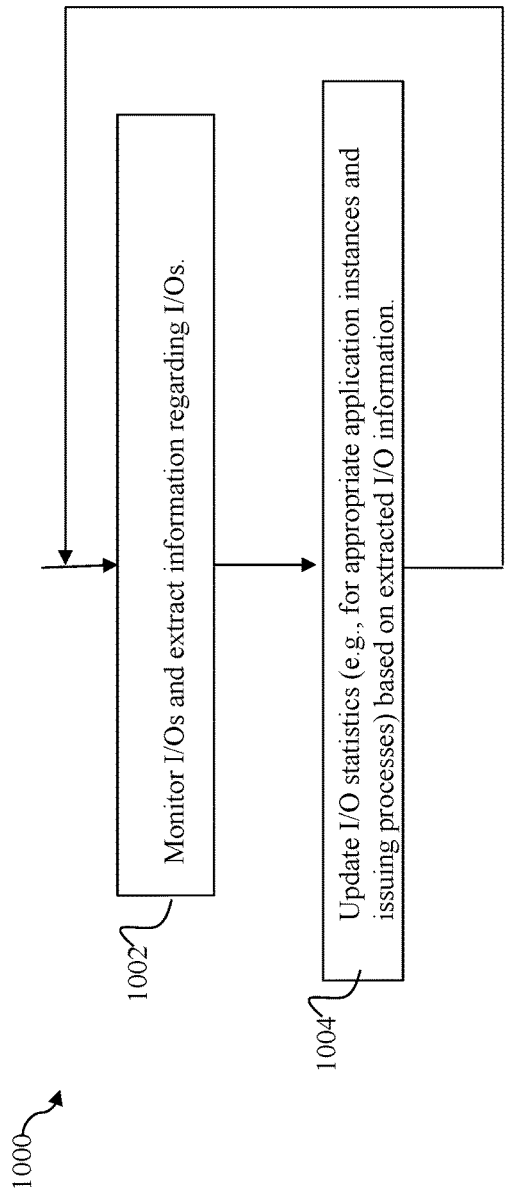

Referring to FIG. 13, shown is a flowchart 1000 of processing steps that may be performed in an embodiment in accordance with techniques herein. The flowchart 1000 summarizes processing as described above such as in connection with FIG. 11. At step 1002, I/Os received that the data storage system may be monitored and information regarding the received I/O may be extracted and used in step 1004 to update I/O statistics per process for each application instance. From step 1004, processing returns to step 1002 whereby the I/O monitoring and statistics collection may be continually performed in an ongoing manner.

Figure 14:
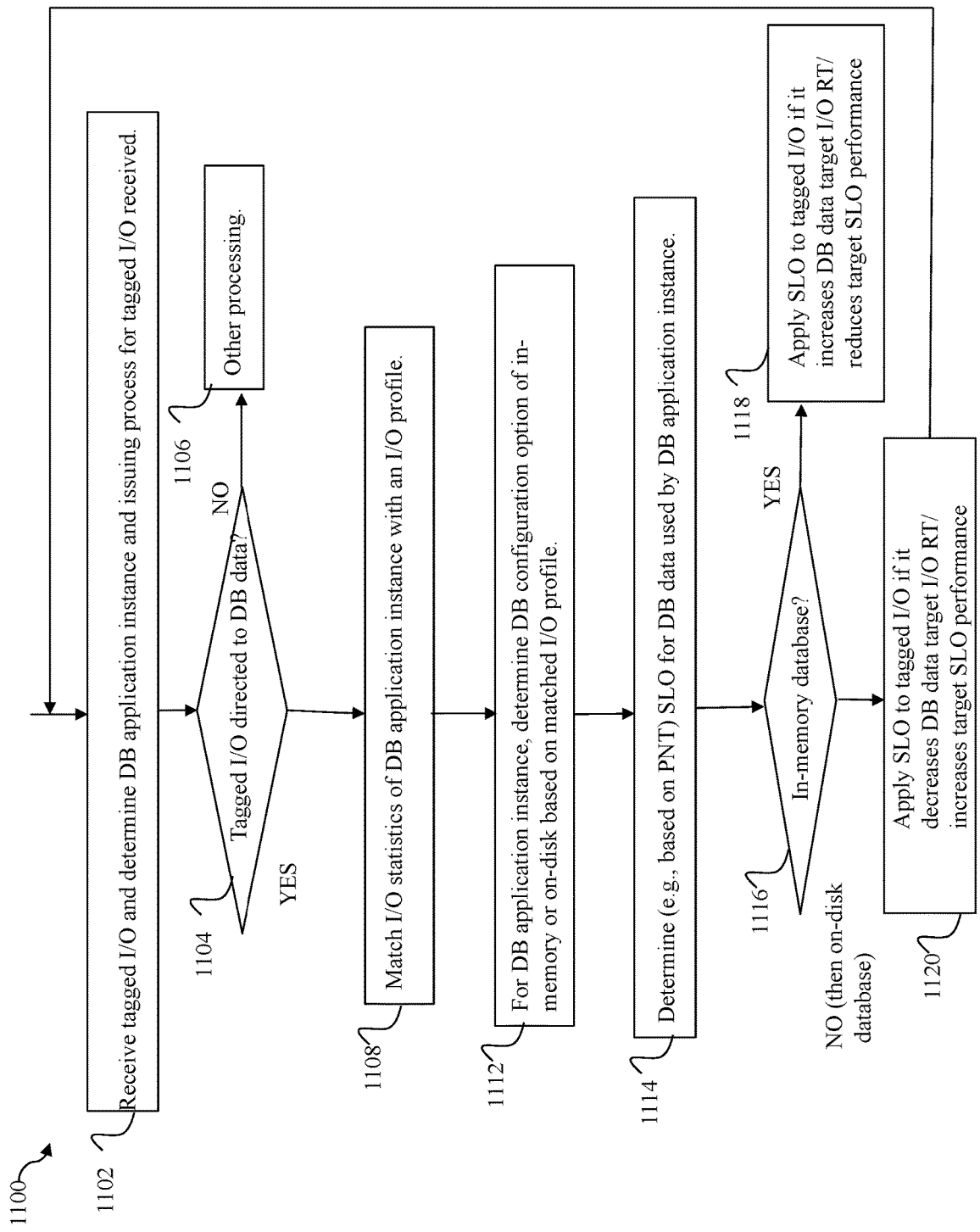

Referring to FIG. 14, shown is another flowchart 1100 of processing steps that may be performed in an embodiment in accordance with techniques herein. The flowchart 1100 summarizes processing as described above such as in connection with FIGS. 12A and 12B. At step 1102, a tagged I/O is received. Using the PNT and I/O tag value of the received tagged I/O, step 1102 includes determining the DB application instance, the application process that issued the tagged I/O, and the type of data file/device (e.g., DB data or log data) accessed by the process. From step 1102 control proceeds to step 1104. At step 1104, processing determines whether the tagged I/O is directed to DB data (not log data). If step 1104 evaluates to no, control proceeds to step 1106 to perform other processing for the received I/O. If step 1104 evaluates to yes, control proceeds to step 1108. At step 1108, processing is performed to match the I/O statistics of the DB application instance with an I/O profile and thus determine a matched I/O profile (e.g., I/O operations and I/O size information from I/O statistics for application match those of one of the I/O profiles). From step 1108, control proceeds to step 1112. At step 1112, for the DB application instance, the DB configuration option of in-memory or on-disk is determined based on the matched I/O profile. From step 1112, control proceeds to step 1114. At step 1114, processing is performed to determine whether there exists an SLO override specified in the PNT for the DBWRITER process of the DB application instance (that issued the tagged I/O received in step 1102). For example, assume the I/O was received from DBWRITER_SALES. In this case, step 1114 may include determining there is an effective SLO specified in an SLO time-frame pair 410 in row 410c of the PNT for DBWRITER_SALES to increase the tagged I/O SLO to DIAMOND. From step 1114, processing proceeds to step 1116.

At step 1116, a determination is made as to whether the DB application instance is configured as an in-memory database (using information obtained from step 1112). If step 1116 evaluates to yes, control proceeds to step 1118 where the SLO obtained from the PNT table may be applied to the tagged I/O only if it increases the DB data target I/O RT (e.g., reduces target SLO performance). Otherwise, no SLO change may be implemented for the tagged I/O whereby the current or default SLO 333 may be used for the tagged I/O. If step 1116 evaluates to no whereby the DB application instance is configured as an on-disk database, control proceeds to step 1120. At step 1120, the SLO obtained from the PNT table may be applied to the tagged I/O only if it decreases the DB data target I/O RT (e.g., increases target SLO performance). Otherwise, no SLO change may be implemented for the tagged I/O whereby the current or default SLO 333 may be used for the tagged I/O. From step 1120, control returns to step 1102 to wait for the next received tagged I/O.

Generally, responsive to receiving a tagged I/O, the processing of FIG. 14 may be performed to determine whether to implement or activate a specified SLO increase or decrease as indicated in the PNT 330 for the tag value of the received tagged I/O. With reference back to FIG. 7, the specified SLO increase or decrease may be denoted by an SLO time-frame pair 410 that is active at the current time when the tagged I/O having a particular tag value is received.

As described herein, the data storage system may perform I/O monitoring and collected I/O statistics per DB application instance process. The statistics may be used to determine a current I/O pattern exhibited by a the DB application instance where the I/O pattern is compared to predetermined I/O profiles to determine a matching I/O profile for the I/O pattern of the DB application instance. Additionally, associated with each I/O profile is a setting or configuration option of in-memory or on-disk, indicating that a DB application exhibiting the I/O profile is configured with the specified setting or configuration option. The specified setting or configuration option of in-memory or on-disk is used in connection with determining whether to apply an SLO change or variance as indicated in the PNT for a tagged I/O. The data storage system may apply the SLO change denoted in the PNT for the tagged I/O to either improve the DB application transaction rate (e.g., apply a lower target I/O RT for the tagged I/O's SLO) for on-disk configurations, or for in-memory configuration, the data storage system may minimize/reduce data storage system resources while maintaining the DB application transaction rate by increasing the target I/O RT for the tagged I/Os SLO.

In some embodiments, a DB application configuration may remain static in that it may not dynamically change between in-memory and on-disk. In such cases, an embodiment may provide a customer or user with an option to disable processing, such as described in connection with FIG. 14, for the DB application instance. In at least one embodiment, a customer may indicate which DB application instances and associated databases are static and also the particular configuration mode of whether the DB instance is configured as in-memory or on-disk. In this case, the static DB instances will not change modes and dynamic I/O profiling and processing of FIG. 14 may be disabled for the DB instance.

In at least one embodiment, a host (including the MP driver that tags I/Os) may perform processing to monitor the DB application performance, such as monitor the observed transaction rate of the DB application instance. If the host detects that the DB application instance performance degrades (e.g. less transactions per second), the host may notify the data storage system regarding the detected performance degradation. It may be that the DB application instance has changed its configuration from in-memory to on-disk and the data storage system may not have yet recognized the change using its dynamic I/O profiling for the DB application. In this case, the dynamic I/O profiling performed by data storage system may be slower to recognize the configuration change from in-memory to on-disk than the host-side monitoring of the DB application performance statistics. Upon receiving the notification from the host regarding the DB application performance degradation, the data storage system may take an action to improve DB application performance. For example, the data storage system may override an existing default SLO used for tagged I/Os and further reduce the target I/O RT SLO for tagged I/Os directed to the DB file. The revised target I/O RT used to override an existing default SLO used for tagged I/Os directed to the DB file may be determined in any suitable manner. For example, the revised target I/O RT used for tagged I/O may be determined using the PNT as described herein for the particular process of the DB application instance that issued the tagged I/O.

In this manner, the host's monitoring of DB application performance and notification to the data storage system of a detected performance degradation may serve as a feedback loop to the data storage system. For example, using techniques herein, the target I/O RT SLO associated with tagged I/Os may be increased for tagged I/Os writing to the DB file of an in-memory DB application configuration. It may be that the increased target I/O RT SLO is too large and, despite being an in-memory configuration, eventually does adversely have a significant impact on DB application performance. In this manner, the feedback loop processing may be used where the host notifies the data storage system regarding the adverse DB application performance so that the data storage system may take a suitable action to improve the DB application performance.

Examples illustrating techniques herein are described with reference to a DB application having two types of data—DB data (e.g., data content stored in the DB) and LOG data (e.g., data denoting the recorded log or operations performed on the DB-records or journals DB data operations performed such as what DB data is deleted, modified, added, etc.). More generally, techniques herein may be used in connection with any application that has multiple data types, where each such type may denote a different type of data used by the application.

The techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer implemented method of processing I/O (input/output) operations comprising:
   receiving, using a processor at a data storage system, an I/O operation including a tag value denoting a process of a database application that issued the I/O operation;
   determining, using a processor and in accordance with the tag value of the I/O operation, whether the I/O operation is directed to a data file storing content of a database or a log file of recorded operations of the database; and
   responsive to determining the I/O operation is directed to the data file storing content of the database, performing first processing using a processor, the first processing including:
      determining a current configuration setting of the database indicating whether the database is configured for use with the database application as an in-memory database; and
      determining, in accordance with the current configuration setting of the database, a first service level objective for the I/O operation, wherein the first service level objective for the I/O operation is a default service level objective or a revised service level objective.

2. The computer implemented method of claim 1, wherein the database is configured as an in-memory database and the database is stored in memory of a host that includes the database application and the process that issued the I/O operation.

3. The computer implemented method of claim 2, wherein the first processing includes:
   determining whether the revised service level objective denotes a higher level of performance than the default service level objective; and
   responsive to determining the revised service level objective denotes a higher level of performance than the default service level objective, setting the first service level objective for the I/O operation to the default service level objective and otherwise setting the first service level objective for the I/O operation to the revised service level objective.

4. The computer implemented method of claim 2, further comprising:
   asynchronously flushing updates of the in-memory database from the host to the data storage system, wherein the updates are applied to a copy of the database stored on non-volatile storage of the data storage system.

5. The computer implemented method of claim 1, wherein the database is configured as an on-disk database stored on the data storage system.

6. The computer implemented method of claim 5, wherein the first processing includes:
   determining whether the revised service level objective denotes a higher level of performance than the default service level objective; and
   responsive to determining the revised service level objective denotes a higher level of performance than the default service level objective, setting the first service level objective for the I/O operation to the revised service level objective and otherwise setting the first service level objective for the I/O operation to the default service level objective.

7. The computer implemented method of claim 1, further comprising:
   monitoring I/Os received on the data storage system and extracting first information regarding the received I/Os, the first information including whether each of the received I/Os is a read or write, an I/O size of each of the received I/Os, and a tag value of each of the received I/Os; and
   updating I/O statistics in accordance with the first information, wherein the I/O statistics denote, for each of a plurality of defined tag values, an I/O pattern observed in connection with received I/O operations having said each defined tag value.

8. The computer implemented method of claim 7, wherein the database application includes the process and a second process each associated with a different one of the plurality of defined tag values, and wherein a first portion of the I/O statistics denotes a first I/O pattern for the process of the database application and a second portion of the I/O statistics denotes a second I/O pattern for the second process of the database application.

9. The computer implemented method of claim 8, further comprising:
   matching first I/O statistics for the database application with one of a plurality of I/O profiles, wherein the first I/O statistics for the database application include the first portion and the second portion of the I/O statistics;
   determining, in accordance with the one I/O profile matching the first I/O statistics, an expected database configuration setting denoting whether a database storing content associated with the one I/O profile is configured as in-memory or on-disk; and
   setting the current configuration setting of the database to the expected database configuration setting associated with the one I/O profile matching the first I/O statistics for the database application.

10. A system comprising:
   a processor; and
   a memory comprising code stored thereon that, when executed, performs a method of processing I/O (input/output) operations comprising:
      receiving, at a data storage system, an I/O operation including a tag value denoting a process of a database application that issued the I/O operation;
      determining, in accordance with the tag value of the I/O operation, whether the I/O operation is directed to a data file storing content of a database or a log file of recorded operations of the database; and
      responsive to determining the I/O operation is directed to the data file storing content of the database, performing first processing including:
         determining a current configuration setting of the database indicating whether the database is configured for use with the database application as an in-memory database; and
         determining, in accordance with the current configuration setting of the database, a first service level objective for the I/O operation, wherein the first service level objective for the I/O operation is a default service level objective or a revised service level objective.

11. A non-transitory computer readable medium comprising code stored thereon that, when executed, performs a method of processing I/O (input/output) operations comprising:
   receiving, at a data storage system, an I/O operation including a tag value denoting a process of a database application that issued the I/O operation;
   determining, in accordance with the tag value of the I/O operation, whether the I/O operation is directed to a data file storing content of a database or a log file of recorded operations of the database; and
   responsive to determining the I/O operation is directed to the data file storing content of the database, performing first processing including:
      determining a current configuration setting of the database indicating whether the database is configured for use with the database application as an in-memory database; and
      determining, in accordance with the current configuration setting of the database, a first service level objective for the I/O operation, wherein the first service level objective for the I/O operation is a default service level objective or a revised service level objective.

12. The non-transitory computer readable medium of claim 11, wherein the database is configured as an in-memory database and the database is stored in memory of a host that includes the database application and the process that issued the I/O operation.

13. The non-transitory computer readable medium of claim 12, wherein the first processing includes:
   determining whether the revised service level objective denotes a higher level of performance than the default service level objective; and
   responsive to determining the revised service level objective denotes a higher level of performance than the default service level objective, setting the first service level objective for the I/O operation to the default service level objective and otherwise setting the first service level objective for the I/O operation to the revised service level objective.

14. The non-transitory computer readable medium of claim 12, wherein the method further comprises:
   asynchronously flushing updates of the in-memory database from the host to the data storage system, wherein the updates are applied to a copy of the database stored on non-volatile storage of the data storage system.

15. The non-transitory computer readable medium of claim 11, wherein the database is configured as an on-disk database stored on the data storage system.

16. The non-transitory computer readable medium of claim 15, wherein the first processing includes:
   determining whether the revised service level objective denotes a higher level of performance than the default service level objective; and
   responsive to determining the revised service level objective denotes a higher level of performance than the default service level objective, setting the first service level objective for the I/O operation to the revised service level objective and otherwise setting the first service level objective for the I/O operation to the default service level objective.

17. The non-transitory computer readable medium of claim 11, wherein the method further includes:
   monitoring I/Os received on the data storage system and extracting first information regarding the received I/Os, the first information including whether each of the received I/Os is a read or write, an I/O size of each of the received I/Os, and a tag value of each of the received I/Os; and
   updating I/O statistics in accordance with the first information, wherein the I/O statistics denote, for each of a plurality of defined tag values, an I/O pattern observed in connection with received I/O operations having said each defined tag value.

18. The non-transitory computer readable medium of claim 17, wherein the database application includes the process and a second process each associated with a different one of the plurality of defined tag values, and wherein a first portion of the I/O statistics denotes a first I/O pattern for the process of the database application and a second portion of the I/O statistics denotes a second I/O pattern for the second process of the database application.

19. The non-transitory computer readable medium of claim 18, wherein the method further includes:
   matching first I/O statistics for the database application with one of a plurality of I/O profiles, wherein the first I/O statistics for the database application include the first portion and the second portion of the I/O statistics;
   determining, in accordance with the one I/O profile matching the first I/O statistics, an expected database configuration setting denoting whether a database storing content associated with the one I/O profile is configured as in-memory or on-disk; and
   setting the current configuration setting of the database to the expected database configuration setting associated with the one I/O profile matching the first I/O statistics for the database application.

\* \* \* \* \*